(12) United States Patent
Matsuo et al.

(10) Patent No.: US 8,201,262 B2
(45) Date of Patent: Jun. 12, 2012

(54) CONTENTS DISTRIBUTION SYSTEM, CONTENTS DISTRIBUTION METHOD, TERMINAL APPARATUS, AND RECORDING MEDIUM ON WHICH PROGRAM THEREOF IS RECORDED

(75) Inventors: Hideki Matsuo, Nagoya (JP); Hirotsugu Unotoro, Nagoya (JP); Yasushi Yanagihara, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 903 days.

(21) Appl. No.: 12/230,163

(22) Filed: Aug. 25, 2008

(65) Prior Publication Data

US 2008/0317250 A1 Dec. 25, 2008

Related U.S. Application Data

(63) Continuation-in-part of application No. PCT/JP2007/051447, filed on Jan. 30, 2007.

(30) Foreign Application Priority Data

Feb. 28, 2006 (JP) ................................. 2006-054049

(51) Int. Cl.
*H04L 29/06* (2006.01)
(52) U.S. Cl. .............................. 726/27; 726/30; 380/277
(58) Field of Classification Search .......... 380/277–279; 726/26, 27
See application file for complete search history.

(56) References Cited

U.S. PATENT DOCUMENTS

| | | | |
|---|---|---|---|
| 2004/0156508 A1 | 8/2004 | Tada et al. | |
| 2005/0044045 A1* | 2/2005 | Pelly et al. | 705/51 |
| 2008/0215594 A1* | 9/2008 | Kamei et al. | 707/10 |

FOREIGN PATENT DOCUMENTS

| | | |
|---|---|---|
| JP | 2002-252607 | 9/2002 |
| JP | 2003-50888 | 2/2003 |
| JP | 2003169089 | * 5/2003 |
| JP | A-2003-169089 | 6/2003 |
| JP | 2003-229843 | 8/2003 |
| JP | 2003244136 | * 8/2003 |
| JP | A-2003-244136 | 8/2003 |
| JP | 2004-341576 | 12/2004 |
| JP | 2004-348264 | 12/2004 |
| JP | 2005124150 | * 5/2005 |
| JP | A-2005-124150 | 5/2005 |

OTHER PUBLICATIONS

Office Action issued in Japanese Patent Application No. 2006-054049 dated Mar. 22, 2011 (with translation).

* cited by examiner

*Primary Examiner* — Kim Vu
*Assistant Examiner* — Randy Moran
(74) *Attorney, Agent, or Firm* — Oliff & Berridge, PLC

(57) ABSTRACT

To prevent a preview of contents by a person who does not have a right to view or listen, by distributing encoded contents data which are difficult for a third person to decode. A new participation terminal apparatus, as well as transmitting a participation request to a parent terminal apparatus of a connection destination candidate, transmits a participation disclosure key for encoding a contents decoding key. The parent terminal of the connection destination candidate which receives the participation disclosure key from the new participation terminal apparatus generates an encoded decoding key, which is a contents decoding key encoded using the participation disclosure key received, and transmits it to the new participation terminal apparatus. The new participation terminal apparatus decodes the encoded decoding key received, using a participation secret key stored in a participation key storage section, acquiring a contents decoding key. Using the contents decoding key, the new participation terminal apparatus decodes distributed encoded contents data, and carries out a reproduction process.

19 Claims, 19 Drawing Sheets

Fig. 19

| DECODING KEY | ENCODED CONTENTS DATA | DECODING KEY | ENCODED CONTENTS DATA | DECODING KEY | ENCODED CONTENTS DATA | DECODING KEY |

CONTENTS DISTRIBUTION SYSTEM, CONTENTS DISTRIBUTION METHOD, TERMINAL APPARATUS, AND RECORDING MEDIUM ON WHICH PROGRAM THEREOF IS RECORDED

CROSS-REFERENCE TO RELATED APPLICATION(S)

The present application is a Continuation-in-Part of International Application No. PCT/JP2007/051447 filed on Jan. 30, 2007, which claims the benefit of Japanese Patent Application No. 2006-054049 filed on Feb. 28, 2006.

BACKGROUND OF THE INVENTION

1. Field of the Invention

The present invention relates to a contents distribution system, a contents distribution method, and a terminal apparatus used therein. In particular, it relates to a contents distribution system, a contents distribution method, and a terminal apparatus used therein, which carry out a transmission and reception of a decoding key for decoding encoded contents data.

2. Description of the Related Art

In recent years, a contents distribution service which carries out a streaming distribution of contents data such as music, a movie, or a talk program, via a network such as an internet, has begun to be launched. As this kind of contents distribution system, a system called P2P (Peer to Peer) communication has been devised in which a terminal apparatus which receives contents data from a distribution source, as well as reproducing the contents data, sequentially relays the contents data to another terminal apparatus.

A format of a contents data distribution system according to this P2P communication is such that, providing a broadcasting station which distributes contents data, and a connection management apparatus (hereafter called a management server) which manages a connection condition of a network in which a plurality of terminal apparatus are logically connected, multi-layered in a hierarchical structure, with the broadcasting station as an apex, contents data distributed from the distribution system are sequentially relayed to a downstream terminal apparatus by means of a relaying function of the terminal apparatus, distributed to all of the plurality of terminal apparatus, and each terminal apparatus can reproduce the contents data received.

A plurality of broadcasting stations distributing contents data exist, one for each viewing or listening channel provided. A user, in a case of wishing to view or listen to a specified channel, can change a viewing or listening channel by switching to a broadcasting station which is carrying out a distribution of specified contents data according with the request.

In the event that contents to be previewed are charged, or in the event that a restriction is applied to a duplication or a transferal of a copyrighted work to be distributed, a method encoding contents to be distributed is used as a technology protection measure. With regard to a decoding key for decoding encoded contents, a method acquiring a decoding key from a key server which stores decoding keys when a terminal apparatus participates in a specified contents distribution system (refer to FIG. 18), or a method regularly inserting a decoding key between items of contents data, and distributing it along with the contents data (refer to FIG. 19), can be considered. For example, in Japanese Unexamined Patent Publication No. 2003-229843, a streaming system is disclosed wherein encoded contents key data for decoding encoded contents data are distributed to a client terminal along with the encoded contents data.

SUMMARY OF THE INVENTION

However, with the system in which each terminal apparatus acquires a decoding key directly from a key server, a problem occurs in that, as inquiries to the key server concentrate every time each terminal apparatus participates in a characteristic contents distribution system, a burden on the key server increases, and a response is delayed (refer to FIG. 18).

Also, with the heretofore known streaming system described in Japanese Unexamined Patent Publication No. 2003-229843, as the encoded contents key data are distributed to the client terminal along with the encoded contents data, a problem occurs in that, by a third person stealing the encoded contents key data, it is possible for a person who does not have a contents previewing right to preview the contents (refer to FIG. 19). Consequently, it is not advisable from a security aspect to distribute a contents decoding key as a broadcast.

The invention having been contrived in order to solve the heretofore described problems, an object is to provide a contents distribution system, a contents distribution method, a terminal apparatus, and a recording medium on which a program thereof is recorded which, rendering unnecessary a key server which notifies a newly participating terminal apparatus of a decoding key, are capable of transmitting a decoding key without introducing the decoding key itself into a contents data communication route.

According to an embodiment of the present invention, a configuration is such that a contents distribution system includes a connection management apparatus which manages in such a way that a plurality of terminal apparatus are logically connected, multi-layered in a hierarchical structure, with a distribution apparatus which distributes contents data as an apex, wherein the contents data distributed from the distribution apparatus being sequentially relayed to a lower level terminal apparatus by a relaying function of the terminal apparatus, and distributed to all of the plurality of terminal apparatus, the contents data can be reproduced by the plurality of terminal apparatus. The connection management apparatus includes: a connection condition information storage section which stores connection condition information of the terminal apparatus configuring the hierarchical structure; a connection destination candidate selection section which, when receiving a connection destination introduction request from a terminal apparatus which is not configuring the hierarchical structure, selects a connection destination candidate from the connection condition information stored in the connection condition information storage section; and a notification section which notifies the terminal apparatus which has transmitted the connection destination introduction request of the connection destination candidate selected by the connection destination candidate selection section. The terminal apparatus includes: a participation key storage section which stores a participation disclosure key and a participation secret key corresponding to the participation disclosure key; a connection destination introduction request transmission section which transmits the connection destination introduction request to the connection management apparatus; a connection destination candidate reception section which receives the connection destination candidate from the connection management apparatus; a new participation request section which, in order to connect to the connection destination candidate received from the connection management apparatus, transmits a participation request and the participation disclosure key to the connection destination candidate; an encoded decoding key reception section which receives an encoded decoding key, encoded by the participation disclosure key, from the connection destination candidate; a contents decoding key acquisition section which decodes the encoded decoding key, received by the encoded decoding key reception section, with the participation secret key; a contents decoding key storage section which stores the contents decoding key decoded by the contents decoding key acquisition section; a contents data reception section which receives encoded contents data transmitted from the connection destination candidate; a contents data decoding section which decodes the encoded contents data with the contents decoding key, and a contents data reproduction section which reproduces the contents data decoded by the contents data decoding section.

BRIEF DESCRIPTION OF THE DRAWINGS

FIG. 19 is a diagram showing a heretofore known method regularly inserting a decoding key between items of contents data, and distributing it to a terminal apparatus.

DESCRIPTION OF THE PREFERRED EMBODIMENT(S)

Hereafter, a description will be given, based on the drawings, of a preferred embodiment of the invention. The embodiment to be described hereafter being a contents distribution system S consisting of a tree-shaped hierarchical structure using a P2P technology (hereafter, this may be called a "topology"), contents distributed from a distribution apparatus (hereafter called a "broadcasting station terminal 1") are sequentially received by terminal apparatus 2a1 to 2d16, which configure the tree-shaped hierarchical structure, by means of the P2P. In the embodiment to be described hereafter, a detailed description will be given of a distribution of software in the distribution system.

1. Configuration and the Like of Contents Distribution System S

Firstly, a description will be given of an outline configuration and the like of the contents distribution system S, referring to FIG. 1.

Figure 1:
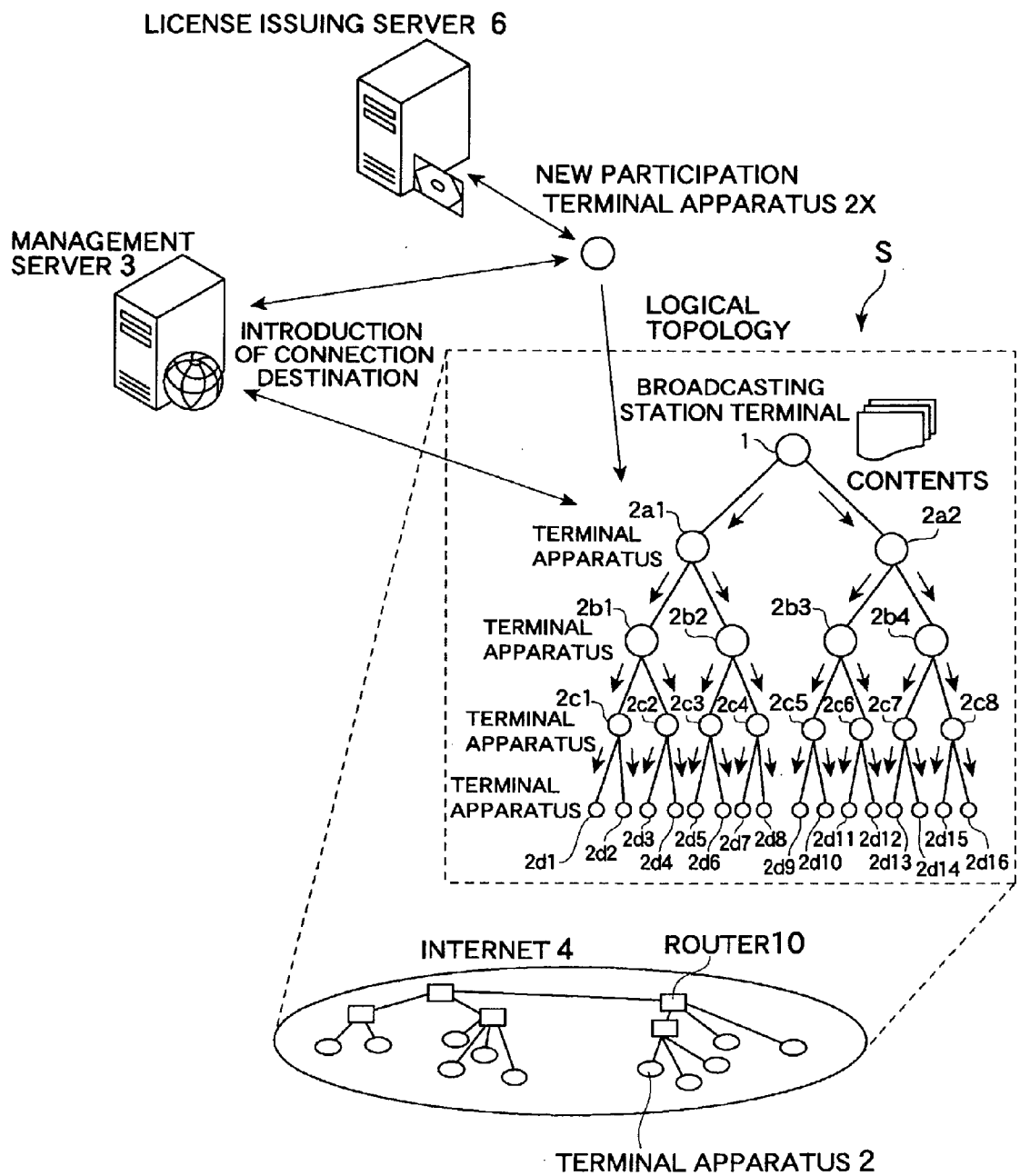
FIG. 1 is a diagram showing an example of an outline configuration of a contents distribution system S according to an embodiment.

FIG. 1 is a diagram showing an example of the outline configuration of the contents distribution system S according to the embodiment. As shown in FIG. 1, the contents distribution system S according to the embodiment includes the broadcasting station terminal 1 as the distribution apparatus, the plurality of terminal apparatus 2a1, 2a2, 2b1 to 2b4, 2c1 to 2c8, and 2d1 to 2d16, a management server 3, which functions as a connection destination introduction apparatus carrying out a management of connection destinations of the plurality of terminal apparatus 2a1, 2a2, 2b1 to 2b4, 2c1 to 2c8, and 2d1 to 2d16, and a license issuing server 6, which issues a license proving possession of a right to carry out a preview of contents.

An IP address being allocated to each of the broadcasting station terminal 1, the terminal apparatus 2a1, 2a2, 2b1 to 2b4, 2c1 to 2c8, and 2d1 to 2d16, and the management server 3 on a physical network, the apparatus are connected via a router 10, or the like, to an internet, as an example of the network. Also, it is also acceptable to have a configuration wherein the broadcasting station terminal 1 is provided inside the management server 3. In this case, it is also acceptable, rather than allocating an IP address to the management server 3, for it to share an IP address with the broadcasting station terminal 1.

In a case of indicating any one terminal apparatus among the terminal apparatus 2a1, 2a2, 2b1 to 2b4, 2c1 to 2c8, and 2d1 to 2d16, or all of the terminal apparatus, it or they will be called a terminal apparatus 2, for the sake of convenience. Also, the terminal apparatus 2a1 and 2a2 on a first level will be called terminal apparatus 2a for the sake of convenience, the terminal apparatus 2b1 to 2b4 on a second level terminal apparatus 2b for the sake of convenience, the terminal apparatus 2c1 to 2c8 on a third level terminal apparatus 2c for the sake of convenience, and the terminal apparatus 2d1 to 2d16 on a fourth level terminal apparatus 2d for the sake of convenience, while a terminal apparatus which is to newly participate in the contents distribution system S will be called a new participation terminal apparatus 2X.

The contents distribution system S is managed by the management server 3 in such a way that the plurality of terminal apparatus 2 are logically connected multilayered in a tree-shaped hierarchical structure, with the broadcasting station terminal 1 as an apex (taken here, for the sake of convenience, to be a zero level).

The management server 3 receives a connection destination introduction request from a new participation terminal apparatus 2X which is not participating in the contents distribution system S. Then, based on a condition of the tree-shaped hierarchical structure of the contents distribution system S, and the like, the management server 3 selects a connection destination candidate (the broadcasting station terminal 1 or a terminal apparatus 2). That is, the management server 3 selects an upstream terminal apparatus to which it is possible for the terminal apparatus 2X to connect in order to receive a streaming distribution. Then, the management server 3 sends notification of the IP address, a port number, communication protocol and the like of the connection destination candidate selected in this way. Herein, an MMS (Microsoft Media Server) protocol, an RTSP (Real Time Streaming Protocol), or the like, is used as the communication protocol. Also, it is possible to use an MPEG-TS (Motion Picture Expert Group-Transport Stream), an ASF (Advanced Streaming Format), a WMA (Windows (registered trademark) Media Audio), a WMV (Windows (registered trademark) Media Video), or the like, as a contents data format.

The new participation terminal apparatus 2X, on receiving the IP address of the connection destination candidate from the management server 3, transmits a request to participate in the contents distribution system S to the connection destination candidate with that IP address. On the connection destination candidate which receives the participation request permitting a connection of the new participation terminal apparatus 2X, the new participation terminal apparatus 2X is embedded in the hierarchical structure of the contents distribution system S. That is, the new participation terminal apparatus 2X attains a condition in which it is permitted to receive a distribution of contents data from the broadcasting station terminal 1. In the event that contents distributed from the broadcasting station terminal 1 are charged contents, or in the event that a restriction is applied to a duplication or a transferal of a copyrighted work, contents data are distributed encoded as a technology protection measure.

By terminal apparatus 2 participating in the contents distribution system S one after the other, the plurality of terminal apparatus 2 are logically connected multilayered in a tree-shaped hierarchical structure, with the broadcasting station terminal 1 as the apex. Then, the contents data distributed from the broadcasting station terminal 1 are sequentially relayed to downstream terminal apparatus 2 by means of a P2P relaying function of the terminal apparatus 2, and distributed to all the terminal apparatus 2.

Contents data such as music or an image delivered by the broadcasting station terminal 1 are divided into predetermined amounts, and sequentially transmitted stored in a plurality of packets (hereafter referred to as "contents packets"). The terminal apparatus 2 which receive the contents packets accumulate the received contents packets in a ring buffer. Then, a configuration is such that the once accumulated contents packets are removed, and sequentially transmitted to the terminal apparatus 2b1 to 2b4 which can receive them.

The terminal apparatus 2 stores the IP addresses of the upstream terminal apparatus 2, or the broadcasting station terminal 1, of the hierarchical structure into which it is embedded, and the IP addresses of the downstream terminal apparatus 2, in a first memory 202, to be described hereafter, and carries out the relay of the contents data using the stored IP addresses. In the invention, in order to prevent a preview of contents data by a person who does not have a right to view or listen, the contents data to be distributed are transmitted encoded.

2. Description of Configuration and the Like of Broadcasting Station Terminal 1

Firstly, a description will be given of a configuration and operations of the broadcasting station terminal 1, referring to FIG. 2.

Figure 2:
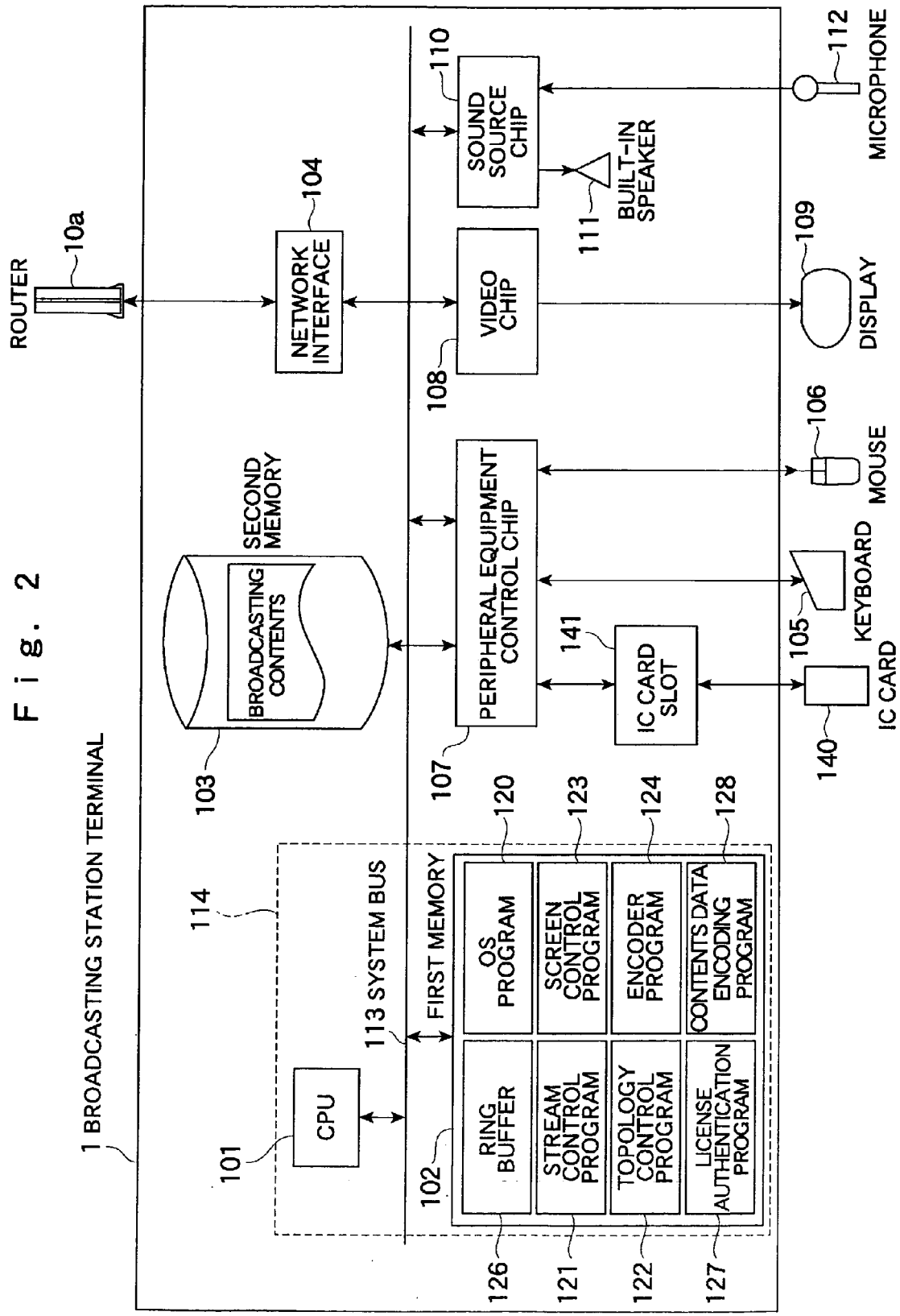
FIG. 2 is a diagram showing an example of an outline configuration of a broadcasting station terminal in the embodiment.

The broadcasting station terminal 1, a general server computer being applicable, being configured, as shown in FIG. 2, including a CPU (Central Processing Unit) 101, a first memory 102, as a rewritable first storage section which stores various kinds of program and the like, a second memory 103, configured of an HDD (Hard Disc Device) or the like, which stores various kinds of data and the like, a network interface 104, which carries out communication with the terminal apparatus 2 and management server 3 via the internet, an input section, such as a keyboard 105 or a mouse 106, capable of inputting predetermined information, a peripheral equipment control chip 107, which controls a writing of information onto, or a retrieval thereof from, an IC card 140 via an IC card slot 141, a video chip 108, which receives image data from the CPU 101 and, as well as writing them into an internal video memory (not shown), displays the data written into the video memory on a display 109, a sound source chip 110, which has a sound source such as an FM (Frequency Modulation) sound source or a Wave Table sound source, a built-in speaker 111, which converts an audio signal transmitted from the sound source chip 110 into a sound wave, and a microphone 112, which inputs a sound signal, these various kinds of component are mutually connected via a system bus 113. The network interface 104 is connected to the internet via a router 10a.

The second memory 103 can store a large amount of update software for use in broadcasting. Also, the second memory 103 functions as a contents data storage section, which stores a large amount of contents data for use in broadcasting, a contents encoding key storage section, which stores a contents encoding key, and a contents decoding key storage section, which stores a contents decoding key. In the embodiment, a controller 114 is configured of the CPU 101 and the first memory 102. Also, the display 109 being connected to the broadcasting station terminal 1 in the heretofore described way, for example, it is visible to an operator who operates the contents distribution system S.

First Memory 102

An OS (Operating System) program 120 for providing basic functions of the broadcasting station terminal 1 as a computer is stored in the first memory 102. Also, a stream control program 121 for carrying out a streaming of contents data stored in the second memory 103, a topology control program 122 for, as well as registering the IP address and the like of its own broadcasting station terminal 1 in the management server 3, carrying out a management and the like of the IP addresses of the first level terminal apparatus 2a, a screen control program 123 for controlling details of a display on the display 109, an encoder program 124 for encoding software data and contents data, a ring buffer 126, which temporarily stores contents data broadcast, a license authentication program 127, which carries out an authentication process for license information transmitted from a new participation terminal apparatus 2X, a contents data encoding program 128, which encodes distributed contents data, and the like being stored in the first memory 102, they are retrieved by the CPU 101, and functions according to the programs are executed by the CPU 101.

Herein, the OS program 120, by being retrieved and executed by the CPU 101, renders executable functions relating to an input and output of the keyboard 105 and mouse 106, and basic functions in the broadcasting station terminal 1, such as a memory management of the first memory 102, the second memory 103, and the like. Then, in a condition in which the OS program 120 is executed by the CPU 101, the heretofore described stream control program 121, topology control program 122, screen control program 123, encoder program 124, and the like, are retrieved from the first memory 102, and executed.

It is acceptable that various kinds of programs such as the OS program 120, stream control program 121, topology control program 122, screen control program 123, and encoder program 124 are, for example, downloaded into the first memory 102 from a server, or the like, connected to the internet, or that programs recorded on a recording medium such as a CD-ROM or the IC card 140 are loaded into the first memory 102 via a drive of the recording medium.

Controller 114

The controller 114, being configured, as heretofore described, of the CPU 101 and first memory 102, centrally controls a whole of the broadcasting station terminal 1 by the CPU 101 retrieving and executing the various kinds of program stored in the first memory 102, as well as functioning as a communication section, a contents data encoding section, an encoded contents data transmission section, an encoding section, a screen control section, a topology management section, and the like, to be described hereafter.

Also, the controller 114 functions as a reception section, which receives license information transmitted by a new participation terminal apparatus 2X which is a source of a request for a software transmission and, in the event of recognizing that the license information received is legitimate license information, functions as an authentication section, which instructs a transmission section to transmit a software transmission request.

The controller 114 functions as the contents data encoding section, by the CPU 101 executing the contents data encoding program 128, and functions as the encoded contents data transmission section, which transmits contents data and encoded contents data, and the like, by the CPU 101 executing the stream control program 121. Also, the controller 114 functions as the topology management section, by the CPU 101 executing the topology control program 122, also, as the display control program, and the like, by the CPU 101 executing the screen control program 123, and also, as the encoding section, by the CPU 101 executing the encoder program 124.

Communication Section

The communication section carries out a distribution of contents data to the terminal apparatus 2 using a distribution protocol. As the distribution protocol, as well as it being possible to use, for example, a streaming distribution protocol (RTSP or the like) under a TCP, it is also possible to arrange in such a way as to use a unique, dedicated protocol.

Encoding Section

The encoding section encodes contents data and the like stored in a contents database of the second memory 103 into a streaming distribution data format, for example, a data format such as ASF, WMA, WMV, MPEG or MP3. As well as it being possible to select the data format by means of the heretofore described input section being operated by the operator, it is also possible to select in accordance with a data format specification packet from the terminal apparatus 2.

Contents Data Encoding Section

The contents data encoding section retrieves contents data for use in broadcasting from the contents data storage section of the second memory 103, and encodes them into a streaming distribution data format with the encoding section, generating contents coded data. Next, the contents data encoding section encodes the contents coded data using the contents encoding key retrieved from the contents encoding key storage section of the second memory 103, generating encoded contents data.

Encoded Contents Data Transmission Section

The encoded contents data transmission section generates separate contents packets, of predetermined data units, from the encoded contents data generated by the contents data encoding section, and sequentially transmits them, via the network interface 104, to the terminal apparatus 2a1 and 2a2 connected on a lower level.

The encoded contents data transmission section, with the IP addresses of the terminal apparatus 2 managed by the topology control program 122 as destination addresses, and the IP address of the broadcasting station terminal 1 as a transmission source, transmits the encoded contents data to the terminal apparatus 2a1 and 2a2. Also, in order to register the broadcasting station terminal 1 in the management server 3, the encoded contents data transmission section transmits information necessary for the registration to the management server 3.

Stream Control Program 121 Broadcast Starting, Broadcast Finishing Functions

The CPU 101, by executing the stream control program 121, executes a starting and finishing of a contents packet generation process, in accordance with a broadcast starting request and a broadcast finishing request from the broadcast operator. The generation of the contents packets is carried out by clipping contents data stored in the second memory 103, configured of the hard disc device or the like, into frame units, and appending information necessary when reproducing to a header.

Topology Control Program 122 Contents Distribution Route Control Function

Also, the CPU 101, by executing the topology control program 122, carries out a process of dynamically generating a distribution route in order to distribute the contents packets generated by the stream control program 121 to the terminal apparatus 2a1, 2a2, and the like, which are logically connected as the downstream terminals. The topology control program 122 manages the IP addresses of the terminal apparatus 2a1 and 2a2 participating in the first level of the tree-shaped hierarchical structure, and the IP address of the broadcasting station terminal 1.

The distribution route with the downstream terminals is generated by responding as the upstream terminal when the terminal apparatus 2a1 or the terminal apparatus 2a2 has transmitted a participation request. That is, in response to a session establishment request and severance request, the CPU 101 updates downstream terminal information of its own terminal apparatus 2, and carries out a starting and stopping of a contents data stream distribution in response to a stream distribution starting and stopping request.

Display Control Section

The display control section has a function of controlling the video chip 108 and the display 109, and displaying various kinds of image information. That is, the display control section controls in what way an image is displayed on the display 109.

Authentication Section

The authentication section carries out a process which requests a transmission of license information from a new participation terminal apparatus 2X, and determines whether or not the license information received from the new participation terminal apparatus 2X is legitimate license information. It is acceptable that the authentication process involves transmitting the license information to the license issuing server 6 and requesting an authentication, and it is also acceptable to arrange in such a way that the license authentication program 127 of the authentication section carries out the authentication process independently.

In the event that the authentication section recognizes that the license information received is legitimate license information, it instructs the encoded contents data transmission section to transmit encoded contents data. By this means, it is possible for a new participation terminal apparatus 2X which holds legitimate license information to acquire contents, and carry out a reproduction of the contents.

3. Description of Configuration and the Like of Terminal Apparatus 2

Figure 3:
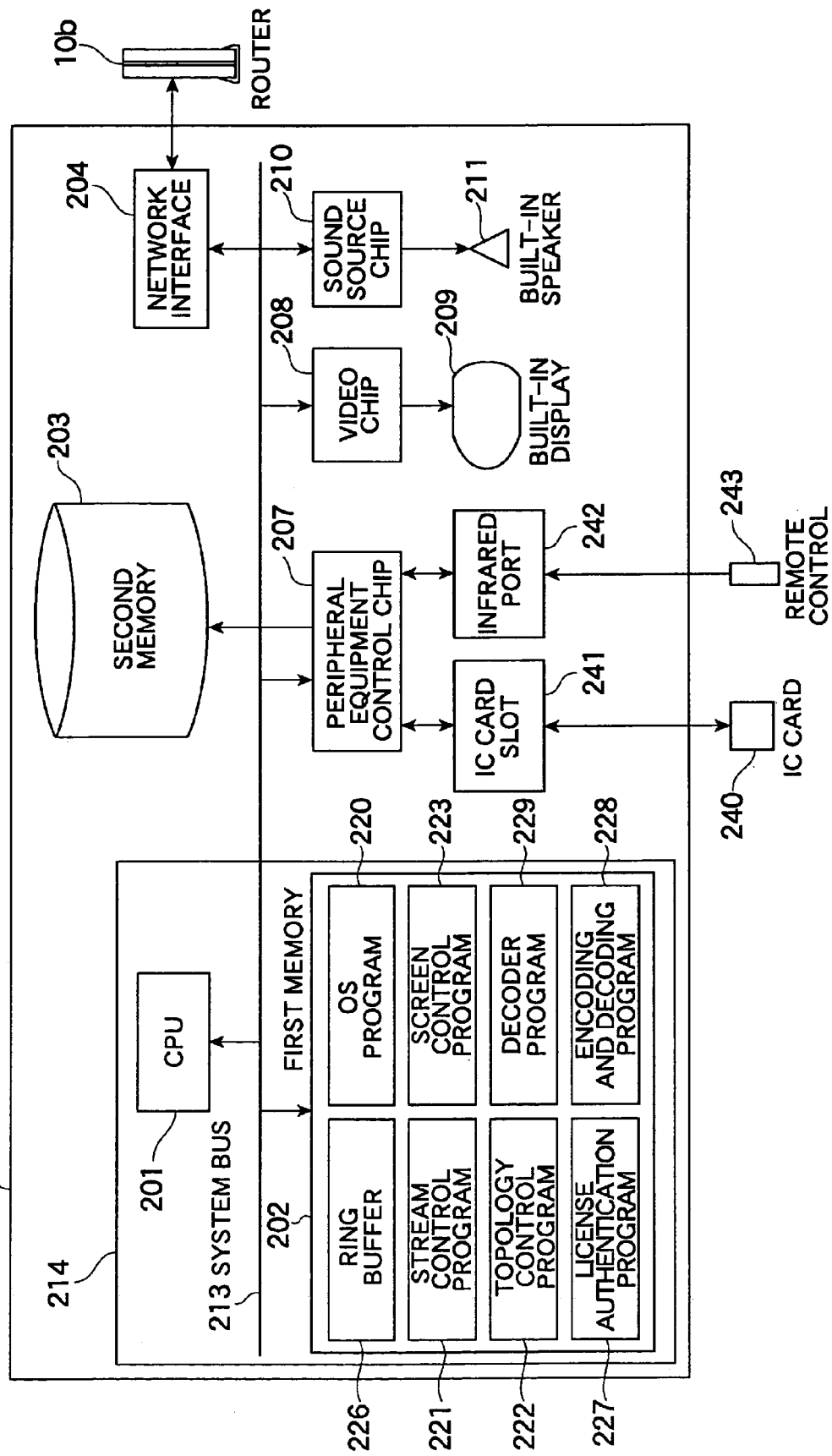
FIG. 3 is a diagram showing an example of an outline configuration of a terminal apparatus in the embodiment.

Next, a description will be given of a configuration of the terminal apparatus 2, using FIG. 3. FIG. 3 is a functional block diagram showing an example of an outline configuration of the terminal apparatus 2. A general personal computer is applicable as the terminal apparatus 2. The terminal apparatus 2 being configured including a CPU (Central Processing Unit) 201, the first memory 202, which stores various kinds of program and the like, a second memory 203, configured of a participation key storage section, a contents decoding key storage section, a re-encoded contents decoding key storage section, a re-encoding key storage section, a hard disc device, which stores various kinds of data, and the like, a network interface 204, which carries out communication with the broadcasting station terminal 1 and management server 3 via the internet, a remote control 243, which transmits and receives a predetermined infrared signal for a remote operation by a user of the terminal apparatus 2, an infrared port 242 for carrying out communication with the remote control 243 by means of infrared rays, a peripheral equipment control chip 207 which, as well as controlling a writing of information onto, or a retrieval thereof from, an IC card 240 via an IC card slot 241, carries out a control of the infrared port 242, a video chip 208, which receives image data from the CPU 201 and, as well as writing them into an internal video memory (not shown), displays the data written into the video memory on a display 209, to be described hereafter, the display 209, which carries out a display in accordance with a signal transmitted from the video chip 208, a sound source chip 210, which has a sound source such as an FM (Frequency Modulation) sound source or a Wave Table sound source, and a built-in speaker 211, which converts an audio signal transmitted from the sound source chip 210 into a sound wave, these various kinds of component are mutually connected via a system bus 213. In the embodiment, a controller 214 is configured of the CPU 201 and the first memory 202. The network interface 204 is connected to a network such as the internet via a router 10b.

First Memory 202

An OS program 220 for providing basic functions of the terminal apparatus 2 as a computer, a stream control program 221 for receiving contents data streaming distributed directly from the broadcasting station terminal 1, or relayed by another terminal apparatus 2, a topology control program 222 for carrying out a management and the like of the IP address of a terminal one level upstream (the broadcasting station terminal 1 or terminal apparatus 2) connected in a tree shape, and the IP addresses of terminal apparatus 2 one level downstream connected in the tree shape, a screen control program 223 for controlling the display 209, a decoder program 229 for decoding encoded contents data, a ring buffer 226, which temporarily stores contents data received, a license authentication program 227, which carries out an authentication process for license information transmitted from a new participation terminal apparatus 2X, an encoding and decoding program 228, which carries out an encoding process and a decoding process on various kinds of data, and the like being stored in the first memory 202, they are retrieved by the CPU 201, and functions according to the programs are executed by the CPU 201.

Herein, the OS program 220, by being retrieved and executed by the CPU 201, renders executable functions relating to an input and output of the remote control 243, and basic functions of the computer which is the terminal apparatus 2, such as a memory management of the first memory 202, the second memory 203, and the like. Then, in a condition in which the OS program 220 is executed by the CPU 201, the heretofore described stream control program 221, topology control program 222, screen control program 223, decoder program 229, and the like, are executed.

It is acceptable to arrange in such a way that that the OS program 220, stream control program 221, topology control program 222, screen control program 223, decoder program 229, and the like are, for example, downloaded into the first memory 202 from a server, or the like, connected to the internet, or that programs recorded on a recording medium such as a CD-ROM are loaded into the first memory 202 via a drive of the recording medium.

Second Memory 203

The second memory 203 functions as a participation key storage section, which stores a participation disclosure key and a participation secret key corresponding to the participation disclosure key, a contents decoding key storage section, which stores a contents decoding key decoded by a contents decoding key acquisition section, a re-encoded contents decoding key storage section, which stores a contents decoding key necessary for decoding re-encoded contents data, and a re-encoding key storage section, which stores a contents re-encoding key which re-encodes the contents data decoded by a contents data decoding section.

Controller 214

The controller 214, being configured, as heretofore described, of the CPU 201 and first memory 202, centrally controls a whole of the terminal apparatus 2 by the CPU 201 retrieving and executing the various kinds of program stored in the first memory 202, as well as causing them to function as a connection destination introduction request transmission section, a connection destination candidate reception section, a new participation request section, an encoded decoding key reception section, the contents decoding key acquisition section, a contents data reception section, the contents data decoding section, a contents data reproduction section, a new participation request reception section, a decoding key encoding section, an encoded decoding key transmission section, an encoded contents data relay section, a contents data re-encoding section, a re-encoded contents data transmission section, a contents re-encoding key setting section, a contents decoding key setting section, a contents decoding key generation section, an authentication section, an input section, a contents decoding key destruction section, and the like, to be described hereafter.

Connection Destination Introduction Request Transmission Section

The connection destination introduction request transmission section, when a terminal apparatus 2 is to be newly connected to the hierarchical structure, transmits data to the management server 3 indicating a connection destination introduction request for requesting a new participation. At this time, the connection destination introduction request transmission section transmits its own distribution capability to the management server 3 along with the connection destination introduction request.

New Participation Request Section

The new participation request section is for embedding a new participation terminal apparatus 2X in the hierarchical structure by connecting to a connection destination candidate received by the connection destination candidate reception section. The new participation request section specifies the IP address or URL, representing a location of the connection destination candidate received from the management server 3, to a transmission destination, and transmits a participation request and participation disclosure key to the network interface 204. The network interface 204 transmits the participation request and participation disclosure key to the terminal apparatus 2 which is the connection destination candidate.

After logically connecting to the terminal apparatus 2, the new participation terminal apparatus 2X, on receiving contents data distributed from an upstream apparatus to which it is logically connected in the hierarchical structure, determines whether or not another terminal apparatus configuring the hierarchical structure is logically connected on the downstream side and, in the event that it determines that a terminal apparatus is logically connected on the downstream side, it can carry out a distribution of encoded contents data to the downstream terminal apparatus.

At this time, the controller 214 of the terminal apparatus 2, based on the stream control program 221 stored in the first memory 202, as well as sequentially storing the contents data distributed from the upstream apparatus in the ring buffer 226 of the first memory 202, carries out a stream control decoding the stored contents data with the decoder program 229, and sequentially reproducing them.

Connection Destination Candidate Reception Section

The connection destination candidate reception section receiving data indicating a connection destination candidate transmitted from the management server 3, location information of a parent terminal apparatus 2, to which a new participation terminal apparatus 2X is to be logically connected, is included.

Channel Participation Function Using Topology Control Program 222

The terminal apparatus 2, in a condition in which it is receiving contents data using the contents distribution system S, on the user switching a channel he or she is viewing or listening to, detaches an upstream terminal apparatus 2 to which it is currently connected, and transmits a connection destination introduction request to the management server 3 with an intent to once more view or listen to a new channel. Then, on receiving from the management server 3 a connection destination candidate of the channel in which it is to newly participate, the terminal apparatus 2 carries out a process of switching a connection to a new terminal apparatus 2, transmits a request to the upstream terminal apparatus 2 to which it is newly connected for a forwarding of contents data, and finishes participation procedures. In the event of acquiring location information of a plurality of terminal apparatus 2 from the management server 3, the CPU 201, by executing the topology control program 222, carries out a process reducing the connection candidates to one, from among the plurality of terminal apparatus 2, based on a degree of proximity in the network, before starting the connection.

Stream Control Program 221

The CPU 201, by executing the stream control program 221, carries out a process of dynamically generating a distribution route in order to relay encoded contents data distributed from the broadcasting station terminal. As heretofore described, the topology control program 222 executes the process of connecting to an upstream terminal apparatus 2 based on the connection candidate acquired from the management server 3. The stream control program 221 requests the upstream terminal apparatus 2 to start a distribution of the encoded contents data after establishing the encoded contents data distribution route, thereby a distribution of the encoded contents data is scheduled to start from the upstream terminal apparatus 2. Meanwhile, a severance of the encoded contents data distribution route is realized by transmitting a session severance request and stream stopping request to the upstream terminal apparatus 2 when participating in a new channel, or when finishing viewing or listening to contents.

Also, the CPU 201 carries out a process of establishing and severing a distribution route with a terminal apparatus 2 to which it is logically connected on the downstream side by executing the topology control program 222. When the downstream terminal apparatus 2 has requested an establishment of a distribution route, the parent terminal apparatus 2 establishes the distribution route by responding as the upstream terminal apparatus 2. Furthermore, the CPU 201, by executing the stream control program 221, carries out a process of updating downstream terminal information in accordance with a session establishment request and severance request, and starting and stopping the stream distribution of the encoded contents data in accordance with an encoded contents data stream distribution starting request and stopping request.

New Participation Request Section

The new participation request section is for embedding a new participation terminal apparatus 2X in the hierarchical structure by transmitting a participation request and a participation disclosure key to the parent terminal apparatus 2 corresponding to the IP address of the connection destination candidate received by the connection destination candidate reception section, logically connecting the new participation terminal apparatus 2X.

Encoded Decoding Key Reception Section

The encoded decoding key reception section receives an encoded decoding key, encoded by the participation disclosure key, from a parent terminal apparatus 2 notified of as a connection destination candidate by the management server 3. The participation disclosure key which the parent terminal apparatus 2 uses in the encoding is the participation disclosure key which the terminal apparatus 2 itself has transmitted to the parent terminal apparatus 2.

Contents Decoding Key Acquisition Section

On the encoded decoding key reception section receiving the encoded decoding key, the contents decoding key acquisition section retrieves the participation secret key stored in the participation key storage section of the second memory 203, and decodes the encoded decoding key received, generating a contents decoding key.

Contents Data Reception Section

The contents data reception section receives encoded contents data streaming transmitted from the parent terminal apparatus 2 notified of as the connection destination candidate, one packet at a time, and temporarily stores them in the ring buffer 226 or the like.

Contents Data Decoding Section

The contents data decoding section decodes the encoded contents data received from the contents data reception section with the contents decoding key, acquiring contents data in the original data format such as, for example, ASF, WMA, WMV, MPEG, or MP3. The contents decoding key is the decoding key which the contents decoding key acquisition section has acquired by decoding the encoded decoding key.

Contents Data Reproduction Section

The contents data reproduction section decodes the contents data in the data format such as ASF, WMA, WMV, MPEG or MP3 which the contents data decoding section has decoded, converting them to image data or sound data. Next, on the contents data reproduction section transmitting the image data to the video chip 208, the video chip 208 transmits an image signal to the built-in display 209. Then, the built-in display 209 displays an image of the contents.

Meanwhile, on the contents data reproduction section transmitting the sound data to the sound source chip 210, the sound source chip 210 transmits a sound signal to the built-in speaker 211. Then, the built-in speaker 211 transmits a sound of the contents.

New Participation Request Reception Section

The new participation request reception section receives a request from a new participation terminal apparatus 2X, which is not yet configuring the hierarchical structure, to participate in the contents distribution system S. Also, the new participation request reception section receives, from the new participation terminal apparatus, a participation disclosure key which encodes a decoding key for decoding encoded contents data distributed from an upper level apparatus.

Also, the new participation request reception section can, as necessary, receive license information proving the existence of a right to reproduce contents data from the new participation terminal apparatus 2X which has made the participation request.

Decoding Key Encoding Section

The decoding key encoding section, using the participation disclosure key which the new participation request reception section has received from the new participation terminal apparatus 2X, carries out a process retrieving and encoding the contents decoding key stored in the contents decoding key storage section of the second memory 203, and generating an encoded decoding key.

Encoded Decoding Key Transmission Section

The encoded decoding key transmission section carries out a process specifying the IP address, or URL or the like, representing a location of the new participation terminal apparatus 2X which has made the participation request, outputting the encoded decoding key which the decoding key encoding section has generated to the network interface 204, and transmitting it to the new participation terminal apparatus 2X.

Encoded Contents Data Relay Section

The encoded contents data relay section carries out a process specifying the IP address, or URL or the like, representing a location of a lower level terminal apparatus, outputting encoded contents data streaming transmitted from the upstream apparatus to the network interface 204, and relaying them to the lower level terminal apparatus.

Contents Data Re-Encoding Section

The contents data re-encoding section carries out a process re-encoding the contents data in the data format such as ASF, WMA, WMV, MPEG or MP3, acquired by decoding the encoded contents data, into an encoded format differing from that of the encoded contents data received from the upper level apparatus. It is acceptable either that the contents data re-encoding section selects and uses one or a plurality of kinds of encoding key stored in advance in the re-encoding key storage section of the second memory 203, or that it uses a new encoding key generated by a contents re-encoding key generation section.

It is acceptable either that the contents data re-encoding section carries out the re-encoding process in a different encoded format or that, with the same encoded format, it merely changes the encoding key.

Contents Re-Encoding Key Generation Section

The contents re-encoding key generation section has a function of newly generating a contents encoding key for every item of encoded contents data received by the contents data reception section, at every predetermined time, or for every new participation terminal apparatus 2X which makes a participation request.

Re-Encoded Contents Data Transmission Section

The re-encoded contents data transmission section carries out a process specifying the IP address, or URL or the like, representing a location of a lower level terminal apparatus 2X which has made a participation request, outputting re-encoded contents data re-encoded by the contents data re-encoding section to the network interface 204, and transmitting them to the lower level terminal apparatus 2.

Contents Re-Encoding Key Setting Section

The contents re-encoding key setting section carries out a process selecting the contents re-encoding key for re-encoding the contents data decoded by the contents data decoding section, and storing them in the re-encoding key storage section.

Also, it is also acceptable to configure in such a way that the contents re-encoding key setting section carries out a process storing a newly generated contents re-encoding key in the re-encoding key storage section.

Also, it is also acceptable to configure in such a way that the contents re-encoding key setting section carries out a process setting a new contents re-encoding key at every predetermined time, for every terminal apparatus 2 logically connected on the lower level, or for every item of contents data, and storing it in the re-encoding key storage section.

Contents Decoding Key Setting Section

The contents decoding key setting section carries out a process setting a contents decoding key for decoding re-encoded contents data encoded by a contents re-encoding key, and storing it in the re-encoded contents decoding key storage section of the second memory 203. As the contents re-encoding key which encodes the contents data, and the contents decoding key which decodes the re-encoded encoded contents data, it is possible to use, for example, keys which form a pair of a disclosure key and a secret key in a disclosure key encoding system, or common keys in a symmetrical key encoding system.

Also, it is also acceptable to configure in such a way that the contents decoding key setting section carries out a process selecting one or a plurality of kinds of contents decoding key stored in advance in the re-encoding key storage section of the second memory 203, and storing it or them in the re-encoding key storage section. In the event that, by using a disclosure key and a secret key in the disclosure key encoding system as a combination of the contents re-encoding key and the contents decoding key, time is needed for the process when decoding contents, it is advisable to use common keys in a symmetrical key encoding system as the combination of the contents re-encoding key and the contents decoding key.

Also, it is also acceptable to configure in such a way that the contents decoding key setting section carries out a process generating a new contents re-encoding key and contents decoding key, and storing them in the re-encoding key storage section.

Also, it is also acceptable to configure in such a way that the contents decoding key setting section carries out a process generating a new contents re-encoding key and contents decoding key at every predetermined time, for every terminal apparatus 2 connected on the lower level, or for every item of contents data, and storing them in the re-encoding key storage section.

Contents Decoding Key Generation Section

The contents decoding key generation section generates a contents decoding key for decoding re-encoded contents data encoded by a contents re-encoding key.

License Purchasing Function

In the event that the user wishes to view or listen to contents of a new channel, it is necessary for a new participation terminal apparatus 2X to participate in a new contents distribution system S. Also, in a case of viewing or listening to charged contents, as it is a precondition that the user has received permission to preview when previewing the contents, it is necessary for the new participation terminal apparatus 2X to complete procedures to purchase a license from the license issuing server 6 before receiving the encoded contents data.

On the user inputting a license purchase request, the new participation terminal apparatus 2X connects to the license issuing server 6, and downloads a license purchasing form. Next, the new participation terminal apparatus 2X displays the downloaded purchasing form on the built-in display 209, and prompts the user to fill out necessary items. On the filling out of the necessary items on the purchasing form being completed, the new participation terminal apparatus 2X uploads the purchasing form to the license issuing server 6. Finally, the license issuing server 6 carries out a purchase settlement based on details of the purchasing form, issues a license, and transmits license information to the new participation terminal apparatus 2X which is the source of the request.

Authentication Section

The authentication section carries out a process determining whether or not license information received from a new participation terminal apparatus 2X is legitimate license information. It is acceptable that the authentication process involves transmitting the license information to the license issuing server 6 and requesting an authentication, and it is also acceptable to arrange in such a way that the license authentication program 227 of the authentication section carries out the authentication process independently.

In the event that the authentication section recognizes that the license information received is legitimate license information, it specifies the IP address, or URL or the like, representing a location of the new participation terminal apparatus 2X, outputs an encoded decoding key to the network interface 204, and transmits it to the logically connected lower level terminal apparatus. By this means, it is possible for only a new participation terminal apparatus 2X which holds legitimate license information to acquire the encoded decoding key, and carry out a reproduction of the contents.

Input Section

With the input section, such as the remote control 243, it is possible to input an instruction from the user to turn on the power, an instruction to turn off the power, an instruction to start a preview of contents, and an instruction to finish the preview, and convey them to the controller 214.

Contents Decoding Key Destruction Section

On an instruction to finish the viewing or listening being input into the input section by the user controlling the input section, the information is conveyed to the controller 214, and the contents decoding key destruction section carries out a process deleting and destroying the contents decoding key stored in the contents decoding key storage section, in order to prevent a theft of contents on which a viewing or listening restriction is imposed, or the like.

Figure 4:
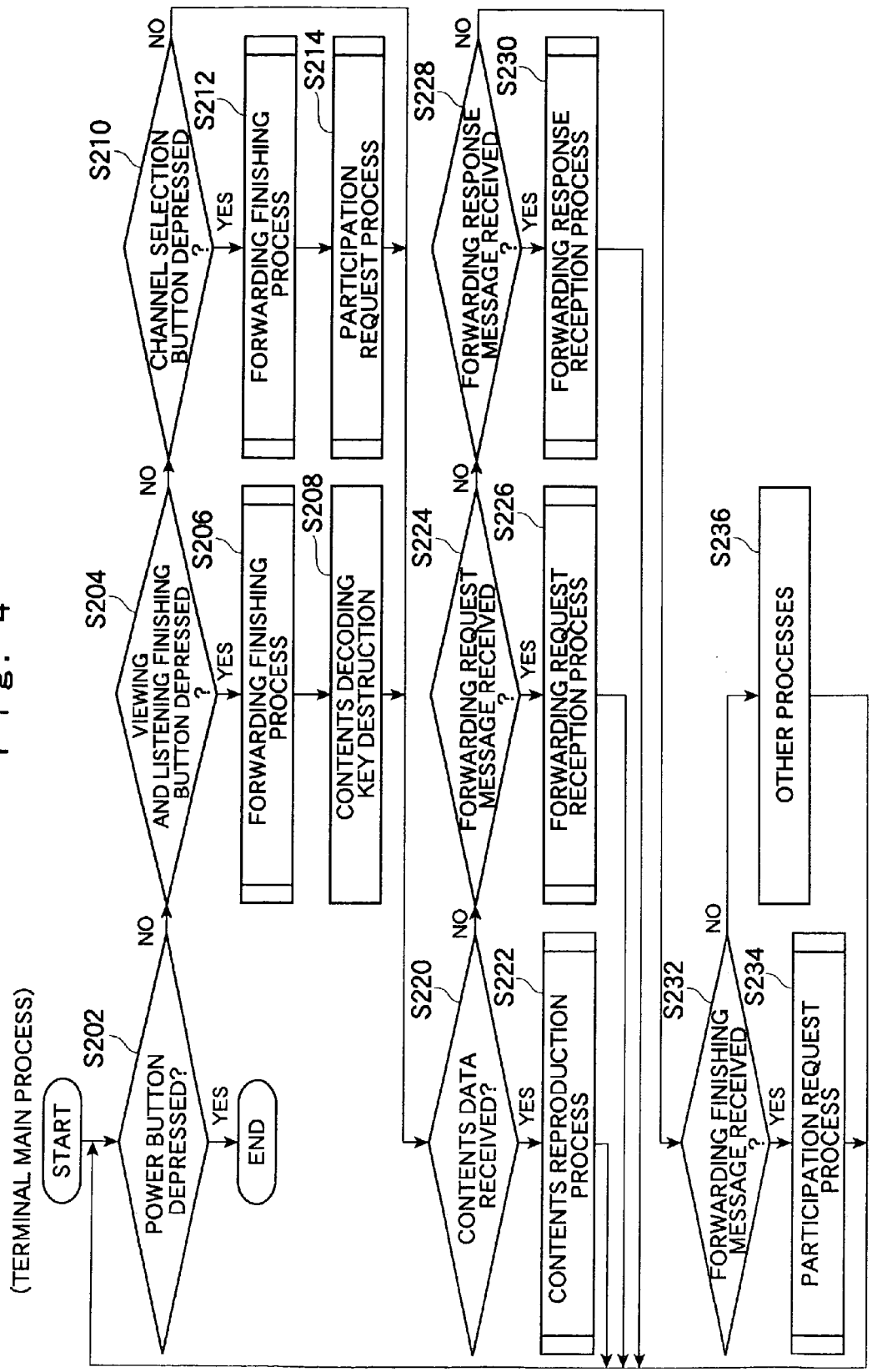
FIG. 4 is a flowchart of an overall process executed by a controller of the terminal apparatus.

Hereafter, a description will be given of processes executed by the controller 214 of the terminal apparatus 2. FIG. 4 shows a flowchart of an overall process executed by the controller 214 on the power of the terminal apparatus 2 being turned on. The terminal apparatus 2, as well as functioning as a parent terminal apparatus 2, can function as a new participation terminal apparatus 2X.

In step S202 (hereafter described abbreviated as S202) shown in FIG. 4, a monitoring is being carried out of whether or not the user has depressed a power button, while the terminal apparatus 2 is in operation, in order to finish a preview of contents. If it is determined that the power button has been depressed by the user (S202: Yes), in order for the user to instruct a power severance, the process proceeds to a finishing process for severing the power. If it is determined that the power button has not been depressed (S202: No), the process branches off to S204.

In S204, a monitoring is being carried out of whether or not a preview finishing button has been depressed by the user in order for the user to finish previewing the contents. If it is determined that the preview finishing button has been depressed by the user (S204: Yes), the process executed by the controller 214 proceeds to S206, and executes a forwarding finishing process. If it is determined that the preview finishing button has not been depressed (S204: No), the process branches off to S210. The preview finishing button is, for example, an operating button provided on the remote control 243, or the like, of the terminal apparatus 2.

In S206, the user having depressed the preview finishing button in order to finish the preview of the contents, the controller 214 carries out a process notifying a lower level terminal of the forwarding finishing, and the like, and withdrawing from the contents distribution system S. A description will be given, using the separate FIG. 11, of the forwarding finishing process.

In the next S208, a process is carried out wherein the contents decoding key destruction section deletes and destroys a contents decoding key stored in the contents decoding key storage section, in order to prevent a theft of contents after the preview of the contents is finished, and the like. On the contents decoding key destruction finishing in S208, the process proceeds to S220.

In S210, a monitoring is being carried out of whether or not a channel selection button has been depressed by the user in order for the user to switch a preview channel. If it is determined that the channel selection button has been depressed by the user (S210: Yes), the process executed by the controller 214 proceeds to S212, and executes the forwarding finishing process. If it is determined that the channel selection button has not been depressed (S210: No), the process branches off to S220. The channel selection button is, for example, an operating button provided on the remote control 243, or the like, of the terminal apparatus 2.

In S212, the user having depressed the channel selection button for switching the contents channel, the controller 214 carries out a process notifying the lower level terminal of the forwarding finishing, and withdrawing from a contents distribution system S of a specified channel. A description will be given, using the separate FIG. 11, of the forwarding finishing process.

On the process of withdrawing from the contents distribution system S of the specified channel being completed in S212, the controller 214, in S214, carries out a process requesting a participation in a contents distribution system S of a new channel. In S214, the connection destination introduction request transmission section transmits a connection destination introduction request to the management server 3. The terminal apparatus 2, by connecting to a parent terminal apparatus 2 which is a connection destination candidate introduced by the management server 3, can participate in a new contents distribution system S. In the invention, as well as transmitting a participation request and a participation disclosure key to the parent terminal apparatus 2, and participating in the contents distribution system S, the encoded decoding key reception section receives the encoded decoding key encoded using the participation disclosure key. A description will be given, using the separate FIG. 5, of the participation request process.

In S220, a determination is being carried out as to whether or not encoded contents data have been received from an upper level parent terminal apparatus 2 after participating in the contents distribution system S. If encoded contents data have not been received (S220: No), the process branches off to S224, while if encoded contents data have been received (S220: Yes), the process proceeds to S222.

In S222, as well as receiving the encoded contents data streaming transmitted from the parent terminal apparatus 2, one packet at a time, and temporarily storing them in the ring buffer 226 or the like, the controller 214, using a contents decoding key decoded by the contents decoding key acquisition section, decodes the encoded contents data, acquiring contents data in ASF, WMA, WMV, MPEG, MP3 or the like.

The contents data reproduction section decodes the contents data, converting them to image data or sound data, and displays an image on the built-in display 209, or transmits sound to the built-in speaker 211. A description will be given, using the separate FIGS. 9 and 10, of a contents reproduction process. On the contents reproduction process finishing, the process returns to the process of S202.

S224 and S226 are processes for functioning as a parent terminal apparatus 2 when logically connecting a new participation terminal apparatus 2X as a lower level terminal.

In S224, the controller 214 is carrying out a determination of whether or not it has received a forwarding request message from a new participation terminal apparatus 2X. If it has not received a forwarding request message (S224: No), the process branches off to S228, while if it has received a forwarding request message (S224: Yes), the process proceeds to the next S226, and executes a forwarding request reception process.

In S226, as well as carrying out a determination as to whether or not it is in a condition in which it can logically connect the new participation terminal apparatus 2X as a lower level terminal, the controller 214 carries out a process generating an encoded decoding key, using the participation disclosure key acquired from the new participation terminal apparatus 2X, and transmitting it to the new participation terminal apparatus 2X. A description will be given, using the separate FIG. 6, of the forwarding request reception process. On the forwarding request reception process finishing, the process returns to the process of S202.

S228 and S230 are processes which, after the new participation terminal apparatus 2X has transmitted the forwarding request message to the parent terminal apparatus 2 when participating in the contents distribution system S, execute a new participation request process, or a contents decoding key generation process or the like, based on a forwarding response acquired from the parent terminal apparatus 2.

In S228, the controller 214 is carrying out a determination of whether or not it has received a forwarding response message from the parent terminal apparatus 2. If it has not received a forwarding response message (S228: No), the process branches off to S232, while if it has received a forwarding response message (S228: Yes), the process proceeds to the next S230, and executes a forwarding response reception process.

In S230, the controller 214, depending on contents of the forwarding response message, carries out another participation request process, or a process decoding the encoded decoding key received from the parent terminal apparatus 2, and generating a contents decoding key, or the like. A description will be given, using the separate FIG. 8, of the forwarding response reception process. On the forwarding response reception process finishing, the process returns to the process of S202.

The processes of S232 and S234 are processes when logically connecting to a new parent terminal when the parent terminal apparatus 2 logically connected as the parent terminal withdraws from the relevant contents distributions system S.

In S232, the controller 214 is carrying out a determination of whether or not it has received a forwarding finishing message from the parent terminal apparatus 2. If it determines that it has received a forwarding finishing message from the parent terminal apparatus 2, in order for the parent terminal apparatus 2 to withdraw from the contents distribution system S (S232: Yes), the process proceeds to the process of S234, while if it determines that it has not received a forwarding finishing message (S232: No), the controller 214, in S236, executes another process in the terminal apparatus 2, and returns to S202.

In S234, the connection destination introduction request transmission section transmits a connection destination introduction request to the management server 3 for requesting a new participation. Then, the connection destination candidate reception section receives a parent terminal introduction message from the management server 3. The IP address or the like of a connection destination candidate to be logically connected as a parent terminal is included in the parent terminal introduction message. The new participation request section, in order to connect to the connection destination candidate, specifies the IP address or the like of the connection destination candidate, and transmits a participation request and participation disclosure key to the connection destination candidate. A description will be given, using the separate FIG. 5, of the participation request process. On the participation request process finishing, the process returns to the process of S202.

The heretofore described S202 to S236 are the main process of the processes executed by the terminal apparatus 2. A description will be given hereafter of the sub-routines of the forwarding finishing process of S206, the participation request process of S214 and S234, the contents reproduction process of S222, the forwarding request reception section of S226, and the forwarding response reception process of S230.

Figure 5:
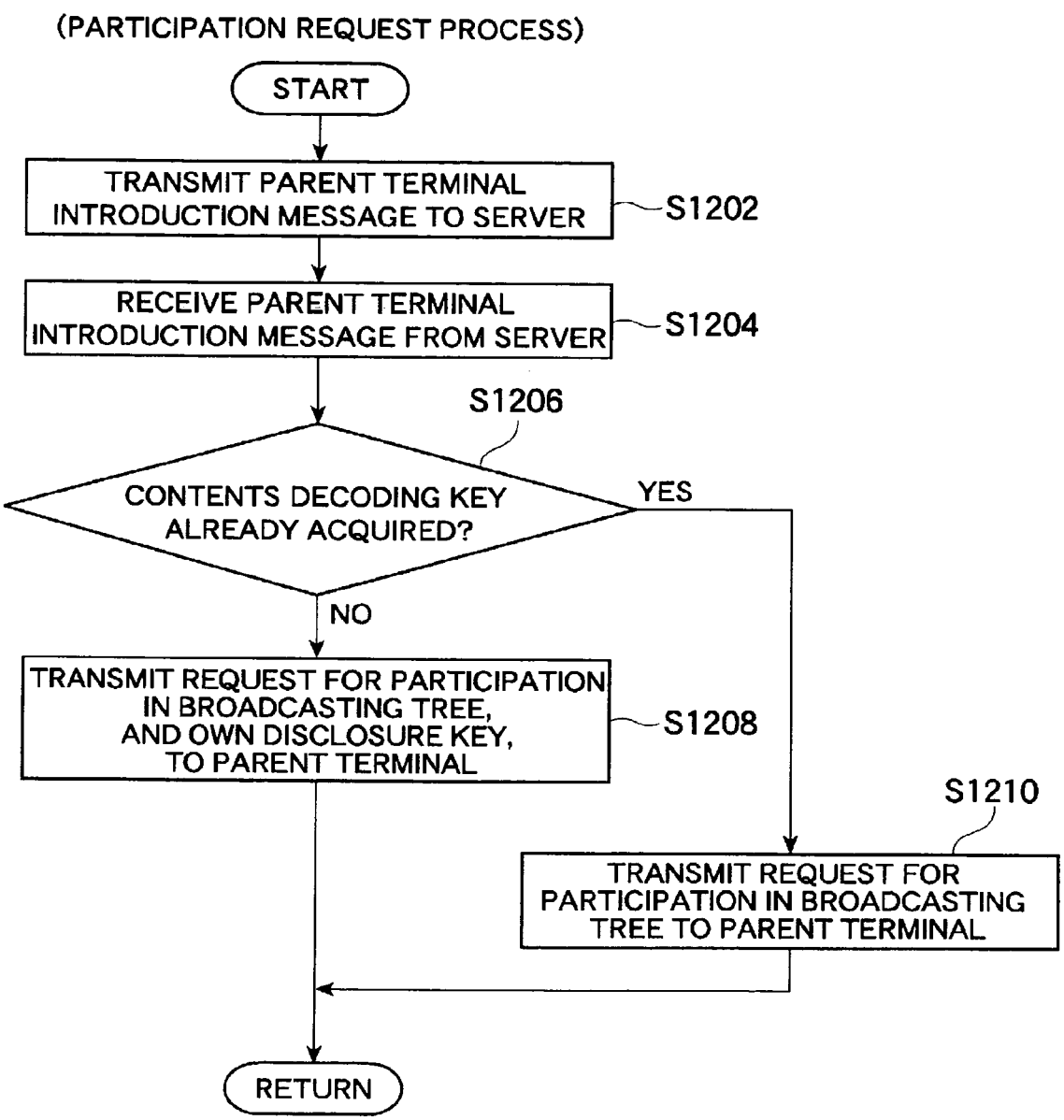
FIG. 5 is a flowchart of a participation request process which the terminal apparatus executes when participating in a new contents distribution system.

FIG. 5 shows a flowchart of the participation request process (S214 and S234 in FIG. 4) which the terminal apparatus 2 executes when participating in a new contents distribution system S.

In the event that a channel to be newly previewed is specified by the user, that is, in the cases of S210: Yes, and S216: No in the forwarding finishing process of S212 in FIG. 4, the controller 214 executes S214, and branches off to S1202. Then, the controller 214 carries out a process transmitting a parent terminal introduction message to the management server 3. Specifically, the connection destination introduction request transmission section transmits a connection destination introduction request to the management server 3 to request a new participation.

On the management server 3 receiving the connection destination introduction request from the new participation terminal apparatus 2X, it selects a suitable connection destination candidate based on connection condition information, such as a structural condition of the hierarchical structure of the contents distribution system S stored in a connection condition information storage section, and transmits a parent terminal introduction message, including the selected connection destination candidate, to the new participation terminal apparatus 2X.

In the next S1204, the connection destination candidate reception section receives the parent terminal introduction message from the management server 3. The IP address of the connection destination candidate to be logically connected as the parent terminal is included in the parent terminal introduction message.

In the next S1206, the controller 214 is carrying out a determination of whether or not it has already acquired a contents decoding key. In a case in which an encoded decoding key is saved in the contents decoding key storage section (S1206: Yes), as in, for example, a case in which, although the parent terminal has withdrawn from the contents distribution system, it connects again within a tree using the same encoded decoding key, the controller 214 branches off to a process of S1210. Also, in a case in which it is necessary to newly acquire a contents decoding key (S1206: No), due to a reason such as the parent terminal having withdrawn from the contents distribution system, the controller 214 proceeds to a process of S1208.

In S1208, the new participation request section, in order to connect to the connection destination candidate, carries out a process specifying the IP address of the connection destination candidate, and transmitting a participation request and participation disclosure key to the connection destination candidate. On the process of S1208 finishing, the process executed by the controller 214 returns to the original routine.

Meanwhile, in S1210, the new participation request section, having already acquired a contents decoding key, carries out a process specifying the IP address of the connection destination candidate, and transmitting a participation request to the connection destination candidate. On the process of S1210 finishing, the process executed by the controller 214 returns to the original routine.

In this way, the new participation terminal apparatus 2X can transmit a participation request for participating in the hierarchical structure.

Figure 6:
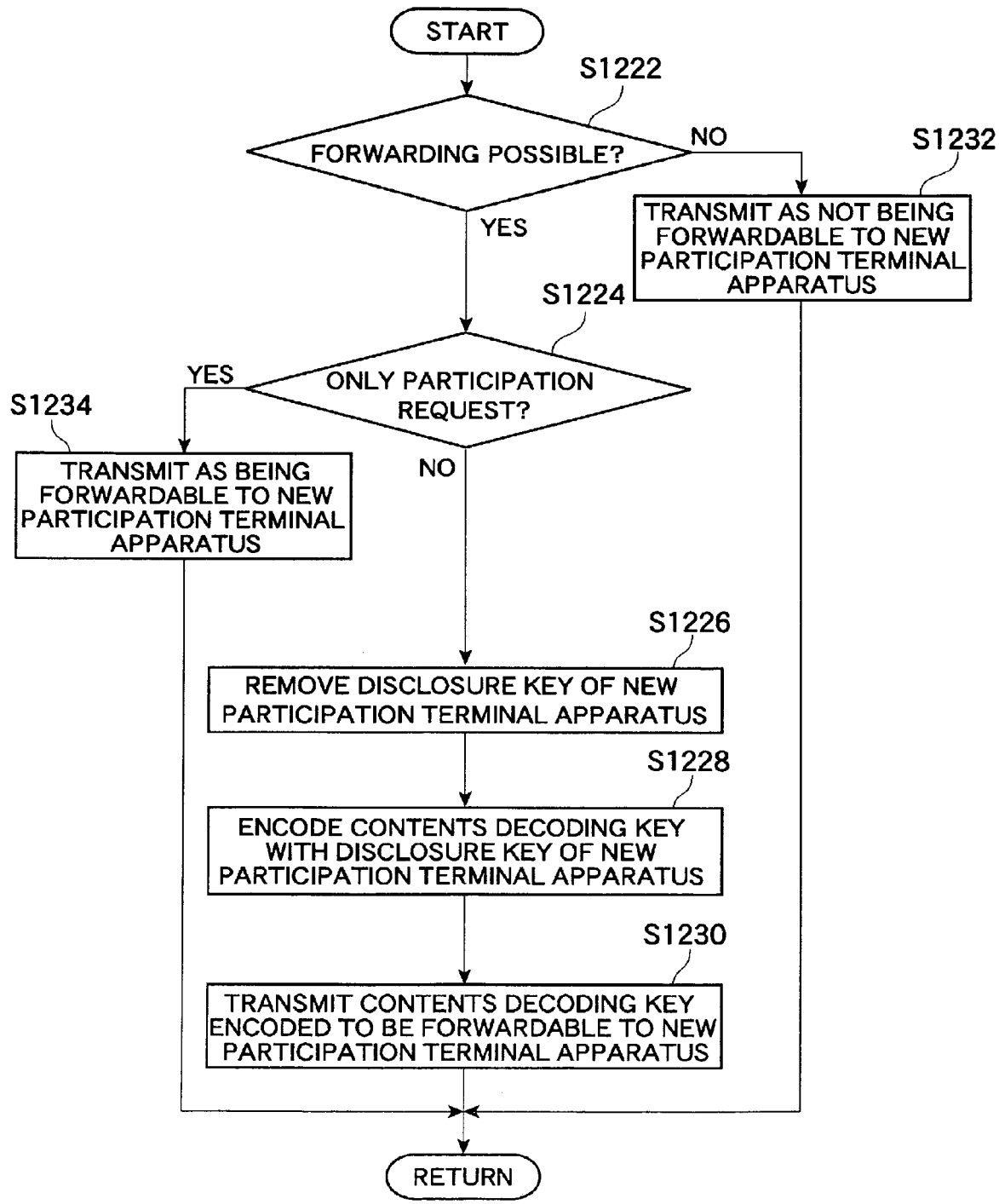
FIG. 6 is a flowchart showing a first embodiment of a forwarding request reception process executed by a parent terminal apparatus when embedding a new participation terminal apparatus on a lower level.

FIG. 6 shows a flowchart showing a first embodiment of the forwarding request reception process (S226 in FIG. 4) executed by the parent terminal apparatus 2, specified as the parent terminal by the management server 3, when embedding the new participation terminal apparatus 2X on the lower level.

On the parent terminal apparatus 2 specified as the parent terminal receiving a forwarding request message from the new participation terminal apparatus 2X, the process executed by the controller 214 branches off to S1222.

In S1222, the controller 214 is carrying out a determination of whether or not it is in a condition in which it can logically connect the new participation terminal apparatus 2X on the lower level, and forward encoded contents data. If it is in a condition in which it cannot forward encoded contents data (S1222: No), such as in a case in which there is no leeway in the process of the controller 214, or a case in which communication traffic is congested, the process branches off to S1232, and transmits a forwarding response message to the new participation terminal apparatus 2X to the effect that the forwarding is impossible. Then, the controller 214 finishes the forwarding request reception process, and returns to the original process routine. Meanwhile, if the controller 214 is in a condition in which the forwarding of encoded contents data to the new participation terminal apparatus 2X is possible (S1222: Yes), the process proceeds to S1224.

In S1224, the controller 214 is carrying out a determination of whether or not a participation disclosure key is included in the participation request received from the new participation terminal apparatus 2X. If no participation disclosure key is included (S1224: Yes), the process proceeds to S1234, and transmits a forwarding response message to the lower level new participation terminal apparatus 2X to the effect that the forwarding is possible. Then, the controller 214 finishes the forwarding request reception process, and returns to the original process routine. Meanwhile, if a participation disclosure key is included in the participation request received (S1224: No), as a contents decoding key is needed in the new participation terminal apparatus 2X, the controller 214 proceeds to processes from S1226 onward, generating and transmitting an encoded decoding key.

In S1226, the controller 214 carries out a process removing the participation disclosure key received from the lower level new participation terminal apparatus 2X. Herein, the controller 214 verifies a signature on an electronic certificate received from the new participation terminal apparatus 2X, and can remove the participation disclosure key and execute subsequent processes only in the event of verifying that information on the participation disclosure key is identical to that registered with a certification authority.

In the next S1228, the decoding key encoding section, using the participation disclosure key received from the new participation terminal apparatus 2X, carries out a process retrieving and encoding a contents decoding key stored in the contents decoding key storage section of the second memory 203, generating an encoded decoding key.

In S1230, the encoded decoding key transmission section carries out a process specifying the IP address, or URL or the like, representing a location of the new participation terminal apparatus 2X which has made the participation request, and transmitting a forwarding response message including the encoded decoding key. Then, the controller 214 finishes the forwarding request reception process, and returns to the original process routine.

In this way, the parent terminal apparatus 2 can transmit a forwarding response message, including information on a possibility or otherwise of forwarding encoded contents data, to a new participation terminal apparatus 2X.

Figure 7:
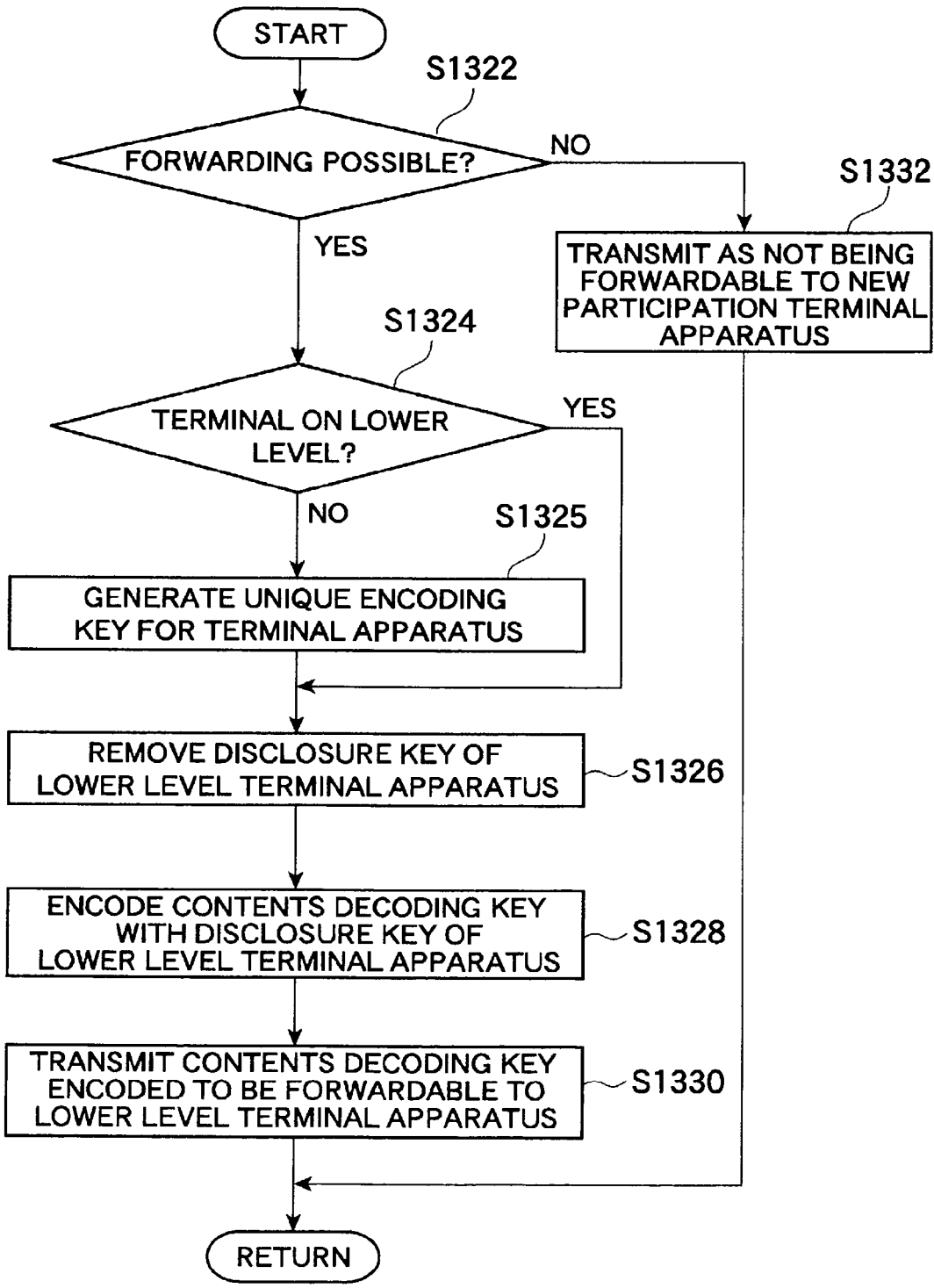
FIG. 7 is a flowchart showing a second embodiment of the forwarding request reception process executed by the parent terminal apparatus when embedding the new participation terminal apparatus on the lower level.

FIG. 7 shows a flowchart showing a second embodiment of the forwarding request reception process (S226 in FIG. 4) executed by the terminal apparatus 2, specified as the parent terminal by the management server 3, when embedding the new participation terminal apparatus 2X on the lower level. In the second embodiment, by using a unique encoded key between each pair of terminal apparatus carrying out a distribution of encoded contents data, it is possible to prevent a reproduction of contents by a person who does not have a right to view or listen.

In S1322, the controller 214 is carrying out a determination of whether or not it is in a condition in which it can logically connect the new participation terminal apparatus 2X on the lower level, and forward encoded contents data. If it is in a condition in which it cannot forward encoded contents data (S1322: No), such as in the case in which there is no leeway in the process of the controller 214, or the case in which communication traffic is congested, the process branches off to S1332, and transmits a forwarding response message to a lower level new participation terminal apparatus 2X to the effect that the forwarding is impossible. Then, the controller 214 finishes the forwarding request reception process, and returns to the original process routine. Meanwhile, if the controller 214 is in a condition in which the forwarding of encoded contents data to a lower level new participation terminal apparatus 2X is possible (S1322: Yes), the process proceeds to S1324.

In S1324, the controller 214 determines, using information of the first memory 202 in which the IP addresses of lower level terminal apparatus 2 are stored, whether or not a terminal apparatus 2 is logically connected on the lower level. If a terminal apparatus 2 is already logically connected on the lower level (S1324: Yes), the controller 214 branches off to S1326 without generating a unique encoding key. Meanwhile, if no terminal apparatus 2 is logically connected on the lower level (S1324: No), the controller 214 proceeds to a process of S1325.

In S1325, the contents encoding key generation section carries out a process generating a unique encoding key (corresponding to a contents re-encoding key) and decoding key when transmitting encoded contents data to the terminal apparatus 2 to be logically connected on the lower level.

Then, the contents re-encoding key setting section stores the newly generated contents re-encoding key and decoding key in the re-encoded contents decoding key storage section.

In the next S1326, the controller 241 carries out a process removing the participation disclosure key received from the lower level terminal apparatus 2. Herein, the controller 214 verifies a signature on an electronic certificate received from the new participation terminal apparatus 2X, and can remove the participation disclosure key and execute subsequent processes only in the event of verifying that information on the participation disclosure key is identical to that registered with a certification authority.

In the next S1328, the decoding key encoding section, using the participation disclosure key received from the lower level terminal apparatus 2X, carries out a process retrieving and encoding a contents decoding key stored in the contents decoding key storage section of the second memory 203, generating an encoded decoding key.

In S1330, the encoded decoding key transmission section carries out a process specifying the IP address, or URL or the like, representing a location of the new participation terminal apparatus 2X which has made the participation request, and transmitting a forwarding response message including the encoded decoding key generated by the decoding key encoding section. Then, the controller 214 finishes the forwarding request reception process, and returns to the original process routine.

In this way, the parent terminal apparatus 2 can transmit a forwarding response message, including information on a possibility or otherwise of forwarding encoded contents data encoded by a unique encoding key, to a new participation terminal apparatus 2X.

Consequently, as well as using a unique encoding key between each pair of terminal apparatus 2 carrying out a distribution of encoded contents data, as the contents decoding key is transmitted to the new participation terminal apparatus in an encoded condition, it is possible to prevent a reproduction of contents by a person who does not have a right to view or listen.

Although, in the second embodiment of the forwarding request reception process (S226 in FIG. 4), a unique encoding key, and a contents decoding key forming a pair therewith, are generated for each terminal apparatus 2, it is also acceptable that the contents re-encoding key setting section selects one from among one, or a plurality of kinds of, contents re-encoding key stored in advance in the second memory 203, and stores it in the re-encoding key storage section, and furthermore, that the contents decoding key setting section selects a contents decoding key to form a pair with the set contents re-encoding key from among one, or a plurality of kinds of, contents decoding key stored in advance in the second memory 203, and stores it in the re-encoded contents decoding key storage section.

Also although, in the second embodiment of the forwarding request reception process (S226 in FIG. 4), a unique encoding key is used for each pair terminal apparatus 2, it is also acceptable to arrange in such a way as to set a new contents re-encoding key and contents decoding key at each predetermined time, or for each item of contents data. In this case, it is acceptable either that the contents re-encoding key setting section stores a contents re-encoding key, newly generated by the contents encoding key generation section, in the re-encoding key storage section, or that the contents re-encoding key setting section selects one from among one, or a plurality of kinds of, contents re-encoding key stored in advance in the second memory 203, and stores it in the re-encoding key storage section. Then, it is acceptable either that the contents decoding key generation section generates a contents decoding key to form a pair with the set contents re-encoding key at every predetermined time, or for every item of contents data, and the contents decoding key setting section stores it in the re-encoded contents decoding key storage section, or that the contents decoding key setting section selects a contents decoding key to form a pair with the set contents re-encoding key from among one, or a plurality of kinds of, contents decoding key stored in advance in the second memory 203, and stores it in the re-encoded contents decoding key storage section.

By so doing, as well as using a unique encoding key at each predetermined time, or for each item of contents data, as the contents decoding key is transmitted to the new participation terminal apparatus in an encoded condition, it is possible to prevent a reproduction of contents by a person who does not have a right to view or listen.

Figure 8:
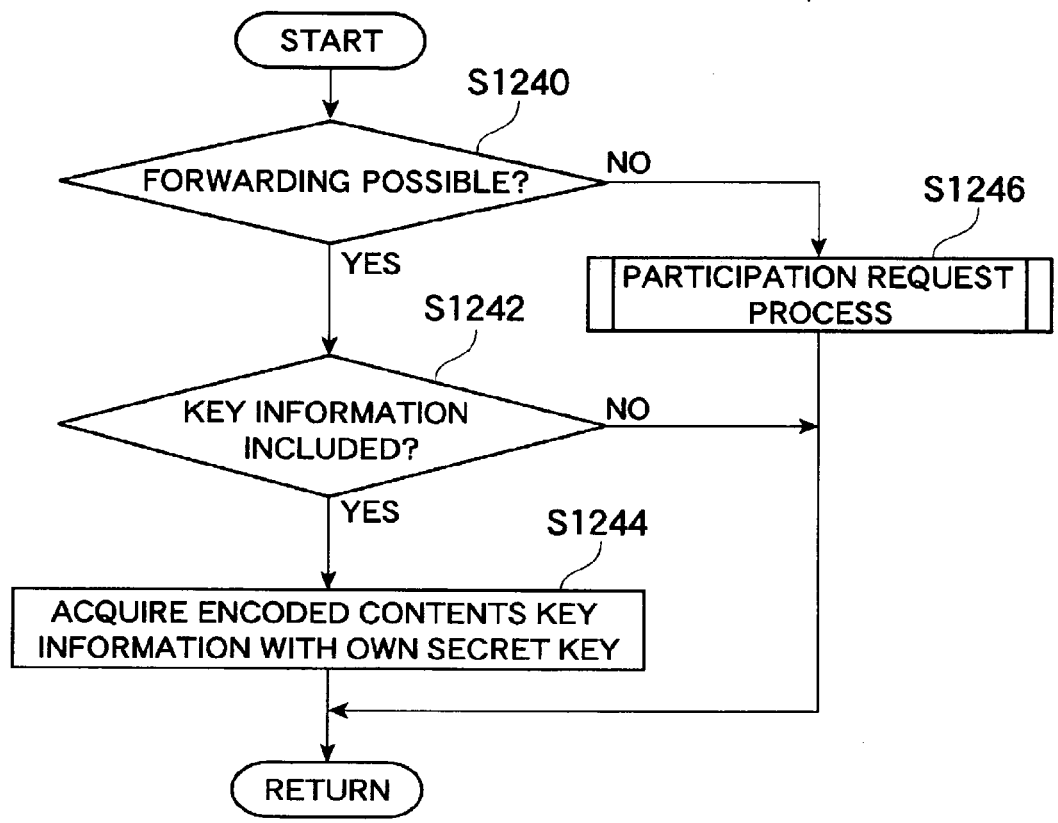
FIG. 8 is a flowchart of a forwarding response message reception process executed by the new participation terminal apparatus after receiving a forwarding response message from the parent terminal apparatus.

FIG. 8 shows a flowchart of the forwarding response message reception process (S230 in FIG. 4) executed by the new participation terminal apparatus 2X after receiving a forwarding response message from the parent terminal apparatus 2.

On the new participation terminal apparatus 2X receiving a forwarding response message from the parent terminal apparatus 2 to which it has made a participation request, the process executed by the controller 214 branches off to S1240.

In S1240, the controller 214 is carrying out a determination of whether or not information to the effect that a forwarding of encoded contents data is possible is included in the forwarding response message. If no information to the effect that the forwarding is possible is included (S1240: No), the controller 214 branches off to S1246, and once more carries out the participation request process (the connection destination introduction process) for having the management server 3 specify a parent terminal (refer to FIG. 5). On the participation request process S1246 finishing, the controller 214 finishes the forwarding response message reception process, and returns to the original process routine. Also if, in S1240, information to the effect that the forwarding of encoded contents data is possible is included (S1240: Yes), the controller 214 proceeds to a process of S1242.

In S1242, the controller 214 carries out a determination of whether or not information on an encoded decoding key is included in the forwarding response message. If no information on an encoded decoding key is included (S1242: No), the controller 214 finishes the forwarding response message reception process, and returns to the original process routine. Also, if information on an encoded decoding key is included (S1242: Yes), the controller 214 proceeds to a process of S1244.

In S1244, the contents decoding key acquisition section, using a participation secret key stored in the participation key storage section of the second memory 203, decodes the encoded decoding key received from the parent terminal apparatus 2, acquiring a contents decoding key. Then, the controller 214 finishes the forwarding response message reception process, and returns to the original process routine.

In this way, the new participation terminal apparatus 2X can acquire a contents decoding key for decoding encoded contents data.

Figure 9:
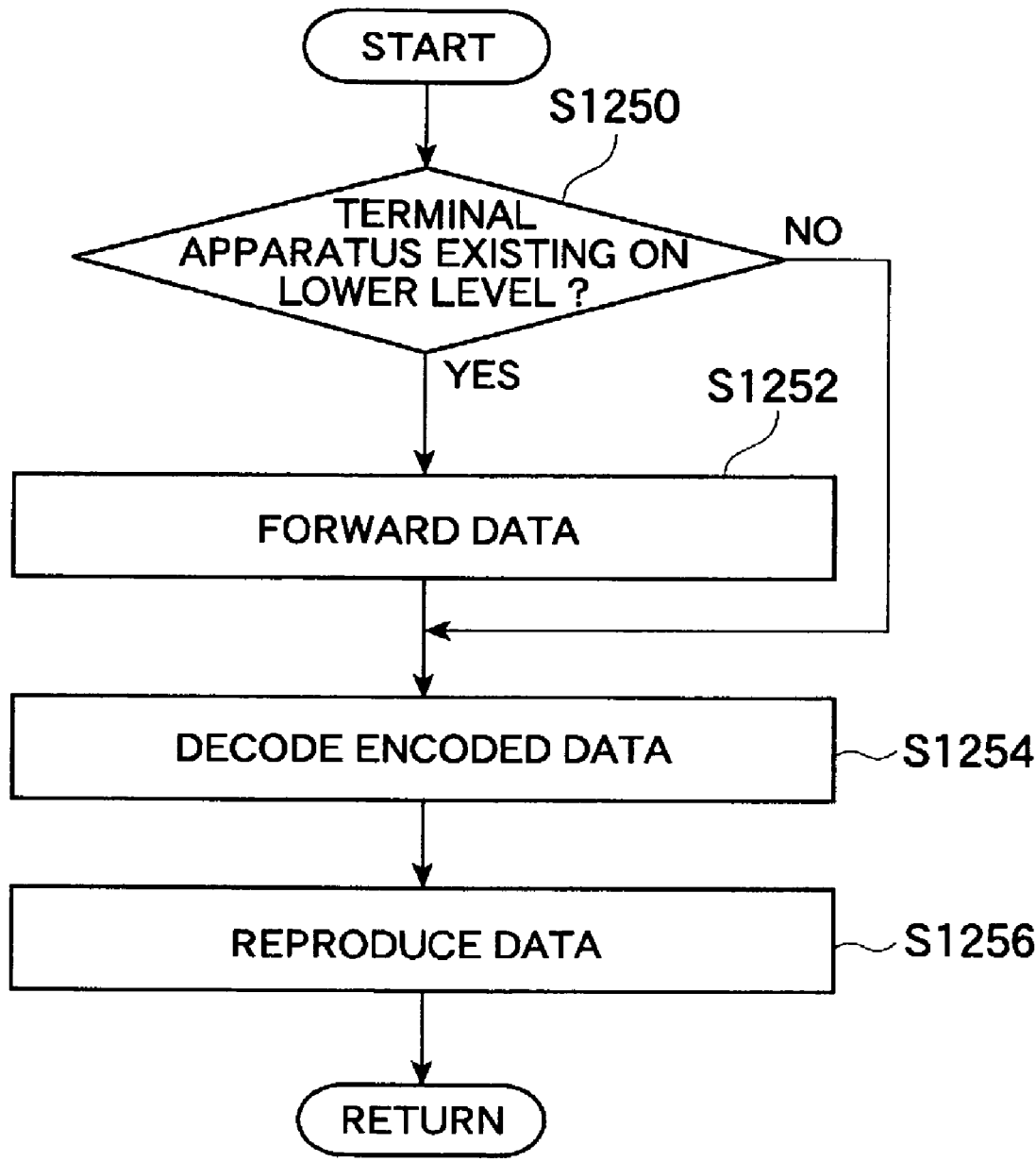
FIG. 9 is a flowchart showing a first embodiment of a contents reproduction process executed by a terminal apparatus which has received encoded contents data from the parent terminal apparatus.

FIG. 9 shows a flowchart showing a first embodiment of the contents reproduction process (S222 in FIG. 4) executed by a terminal apparatus 2 which has received encoded contents data from a parent terminal apparatus 2. The first embodiment, being an embodiment whereby encoded contents data received from an upper level parent terminal apparatus 2 are transmitted as they are to a lower level terminal apparatus 2 without being re-encoded, is an embodiment corresponding to the first embodiment (FIG. 6) of the forwarding request reception process (S226 in FIG. 4).

On receiving the encoded contents data from the upper level parent terminal apparatus 2, the process executed by the controller 214 branches off to S1250.

In S1250, the controller 214 is carrying out a determination of whether or not a terminal apparatus 2 is logically connected on a level below the terminal apparatus 2. If no terminal apparatus 2 is logically connected on the level below (S1250: No), the process branches off to S1254, while if a terminal apparatus 2 is logically connected on the level below (S1250: Yes), the process proceeds to the next S1252.

In S1252, the encoded contents data relay section carries out a process specifying the IP address, or URL or the like, representing a location of the lower level terminal apparatus 2, and relaying encoded contents data streaming transmitted from the upper level apparatus to the logically connected lower level terminal apparatus 2.

In the next S1254, the contents data decoding section decodes the encoded contents data received from the upper level terminal apparatus 2 with a contents decoding key, acquiring contents data in the original data format such as, for example, ASF, WMA, WMV, MPEG or MP3. The contents decoding key is a decoding key which the contents decoding key acquisition section has acquired by decoding an encoded decoding key.

In S1256, the contents data reproduction section decodes contents data decoded by the contents data decoding section, converting them into image data or sound data. Then, the contents data reproduction section transmits an image signal to the built-in display 209 by transmitting the image data to the video chip 208, and the built-in display 209 displays an image of the contents. Also, the contents data reproduction section transmits a sound signal to the built-in speaker 211 by transmitting the sound data to the sound source chip 210, and the built-in speaker 211 transmits a sound of the contents. On the contents data reproduction process finishing, the controller 214 returns to the original process routine.

In this way, the terminal apparatus 2 participating in the contents distribution system S can, as well as forwarding received encoded contents data to a lower level terminal apparatus 2, decode the encoded contents data and carry out a reproduction of the contents.

Figure 10:
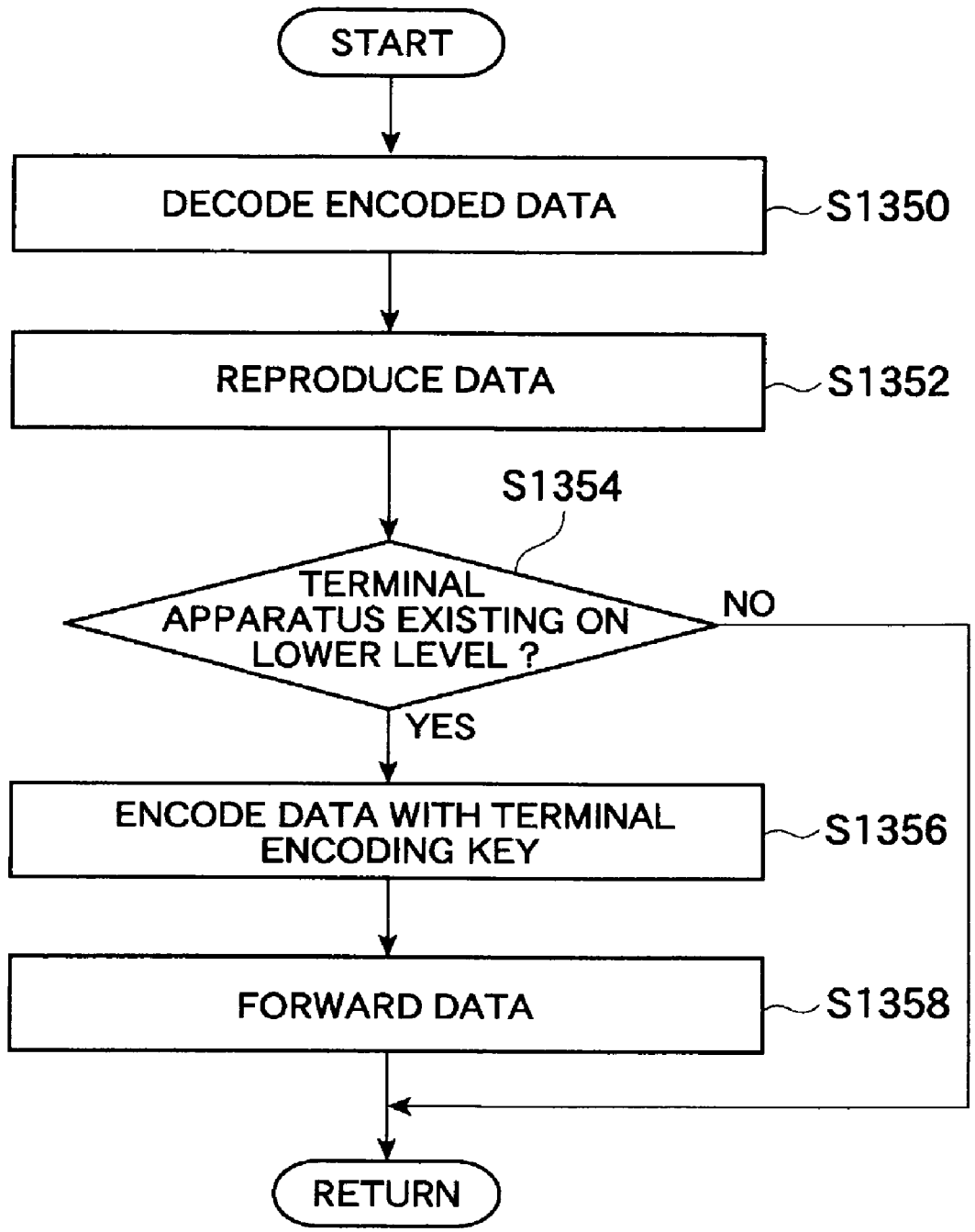
FIG. 10 is a flowchart showing a second embodiment of the contents reproduction process executed by the terminal apparatus which has received the encoded contents data from the parent terminal apparatus.

FIG. 10 shows a flowchart showing a second embodiment of the contents reproduction process (S222 in FIG. 4) executed by a terminal apparatus 2 which has received encoded contents data from a parent terminal apparatus 2. The second embodiment, being an embodiment whereby encoded contents data received from an upper level parent terminal apparatus 2 are re-encoded and transmitted to a lower level terminal apparatus 2, is an embodiment corresponding to the second embodiment (FIG. 7) of the forwarding request reception process (S226 in FIG. 4).

On receiving the encoded contents data from the upper level parent terminal apparatus 2, the process executed by the controller 214 branches off to S1350.

In S1350, the contents data decoding section decodes the encoded contents data received from the upper level terminal apparatus 2 with a contents decoding key, acquiring contents data in the original data format such as, for example, ASF, WMA, WMV, MPEG or MP3. The contents decoding key is a decoding key acquired by decoding an encoded decoding key received from the upper level terminal apparatus 2.

In the next S1352, the contents data reproduction section decodes contents data decoded by the contents data decoding section, converting them into image data or sound data. Then, the contents data reproduction section transmits an image signal to the built-in display 209 by transmitting the image data to the video chip 208, and the built-in display 209 displays an image of the contents. Also, the contents data reproduction section transmits a sound signal to the built-in speaker 211 by transmitting the sound data to the sound source chip 210, and the built-in speaker 211 transmits a sound of the contents.

In the next S1354, the controller 214 is carrying out a determination of whether or not a terminal apparatus 2 is logically connected on a level below the terminal apparatus 2. If no terminal apparatus 2 is logically connected on the level below (S1354: No), the controller 214 finishes the contents reproduction process, while if a terminal apparatus 2 is logically connected on the level below (S1354: Yes), the controller 214 proceeds to the next S1356.

In S1356, the contents data re-encoding section carries out a process re-encoding the contents data in the data format such as ASF, WMA, WMV, MPEG or MP3, acquired by the contents data decoding section decoding the encoded contents data, into an encoded format differing from that of the encoded contents data received from the upper level apparatus. Also, it is also acceptable to carry out a process carrying out the re-encoding using the same format as the encoded format, but with the encoding key changed.

With regard to a contents re-encoding key which re-encodes, it is acceptable either to set and use one after selecting from one, or a plurality of kinds thereof, stored in advance in the re-encoding key storage section of the second memory 203, or that the contents re-encoding key generation section newly generates one. A decoding key for decoding re-encoded encoded contents data is decoded using a participation disclosure key acquired in advance from the lower level terminal apparatus 2, and transmitted to the lower level terminal apparatus 2.

In S1358, the encoded contents data relay section carries out a process specifying the IP address, or URL or the like, representing a location of the lower level terminal apparatus, and relaying re-encoded encoded contents data to the logically connected lower level terminal apparatus. On the contents data relaying process finishing, the controller 214 returns to the original process routine.

In this way, by relaying encoded contents data differing for each item of contents, it is possible to prevent a use of contents which infringes a contract, and carry out a protection and the like of a copyrighted work. It is also acceptable to set a contents re-encoding key which re-encodes at every predetermined time, or for every item of contents data.

In this way, by relaying encoded contents data differing at every predetermined time, or for every terminal apparatus, it is possible to prevent a use of contents which infringes a contract, and carry out a protection and the like of a copyrighted work.

Figure 11:
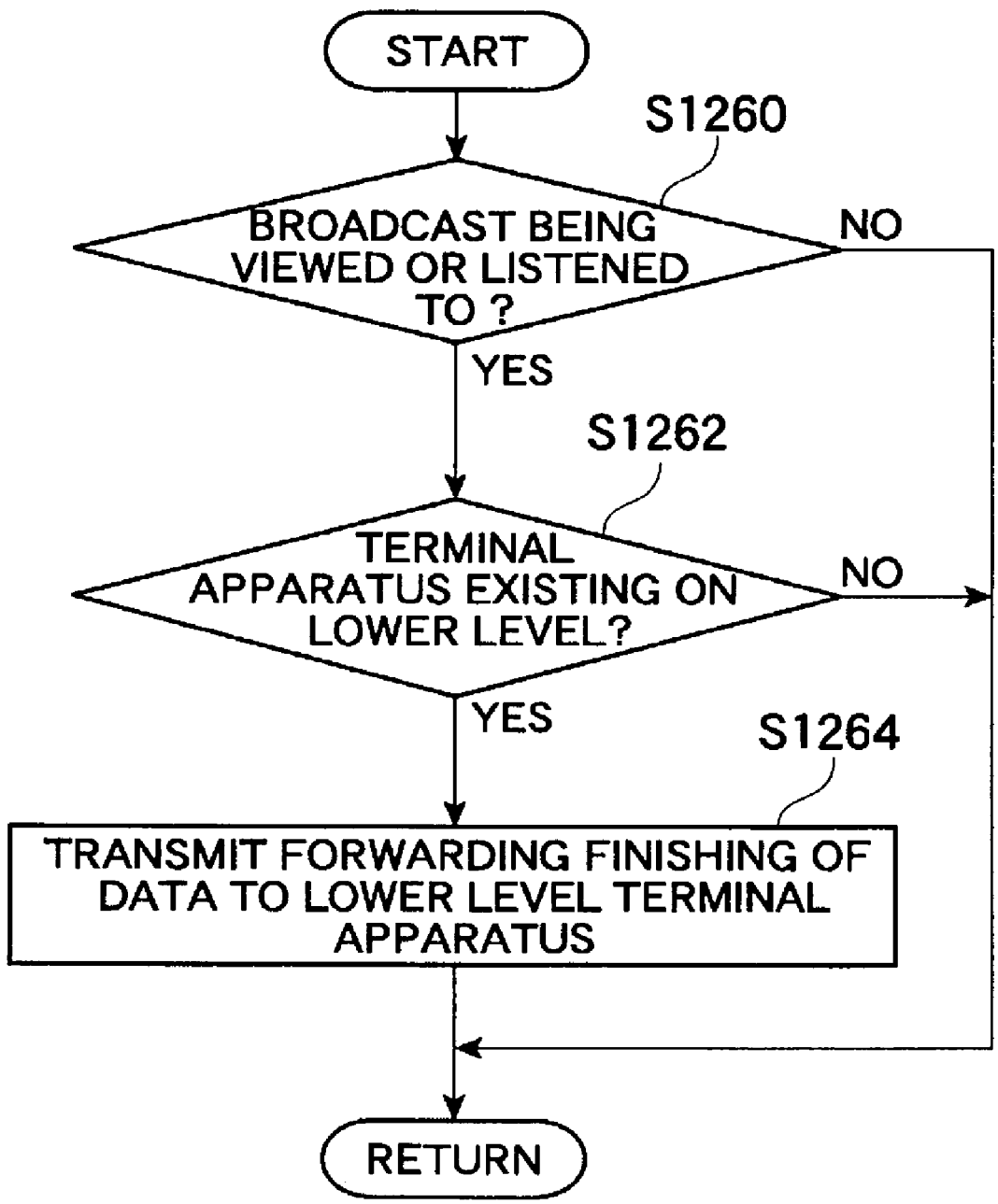
FIG. 11 is a flowchart of a forwarding finishing process when the parent terminal apparatus which has been participating in the contents distribution system withdraws from the contents distribution system.

FIG. 11 shows a flowchart of the forwarding finishing process when a parent terminal apparatus 2 which has been participating in the contents distribution system S withdraws from the contents distribution system S.

If the user has depressed the preview finishing button (S204: Yes in FIG. 4), or if the user has depressed the channel selection button (S210: Yes in FIG. 4), the controller 214 carries out the process of S212, in order to withdraw from the contents distribution system S in which it is currently participating, and branches off to a process of S1260.

In S1260, the controller 214 is carrying out a determination of whether or not it is currently previewing broadcast contents. If it is not carrying out a preview of broadcast contents (S1260: No), the controller 214 finishes the forwarding finishing process, and returns to the original routine. Meanwhile, if it is carrying out a preview of broadcast contents (S1260: Yes), the controller 214 proceeds to a process of S1262.

In S1262, the controller 214 carries out a determination of whether or not a terminal apparatus 2 is logically connected on a lower level. If no terminal apparatus 2 is connected on the lower level (S1262: No), the controller 214 finishes the forwarding finishing process, and returns to the original routine. Meanwhile, if a terminal apparatus 2 is connected on the lower level (S1262: Yes), the controller 214 proceeds to a process of S1264.

In S1264, the controller 214, as well as notifying the terminal apparatus 2 connected on the lower level of the finishing of the forwarding of the encoded contents data, also notifies the management server that it is withdrawing, finishes the forwarding finishing process, and returns to the original routine.

In this way, a terminal apparatus 2 participating in the contents distribution system S as a parent terminal can carry out a process for withdrawing from the contents distribution system S.

4. Description of Configuration and the Like of Management Server 3

Next, a description will be given of a configuration and operations of the management server 3, referring to FIG. 12. The management server 3 has a function of introducing a terminal apparatus 2 which is to become a parent to a new participation terminal apparatus 2X.

Figure 12:
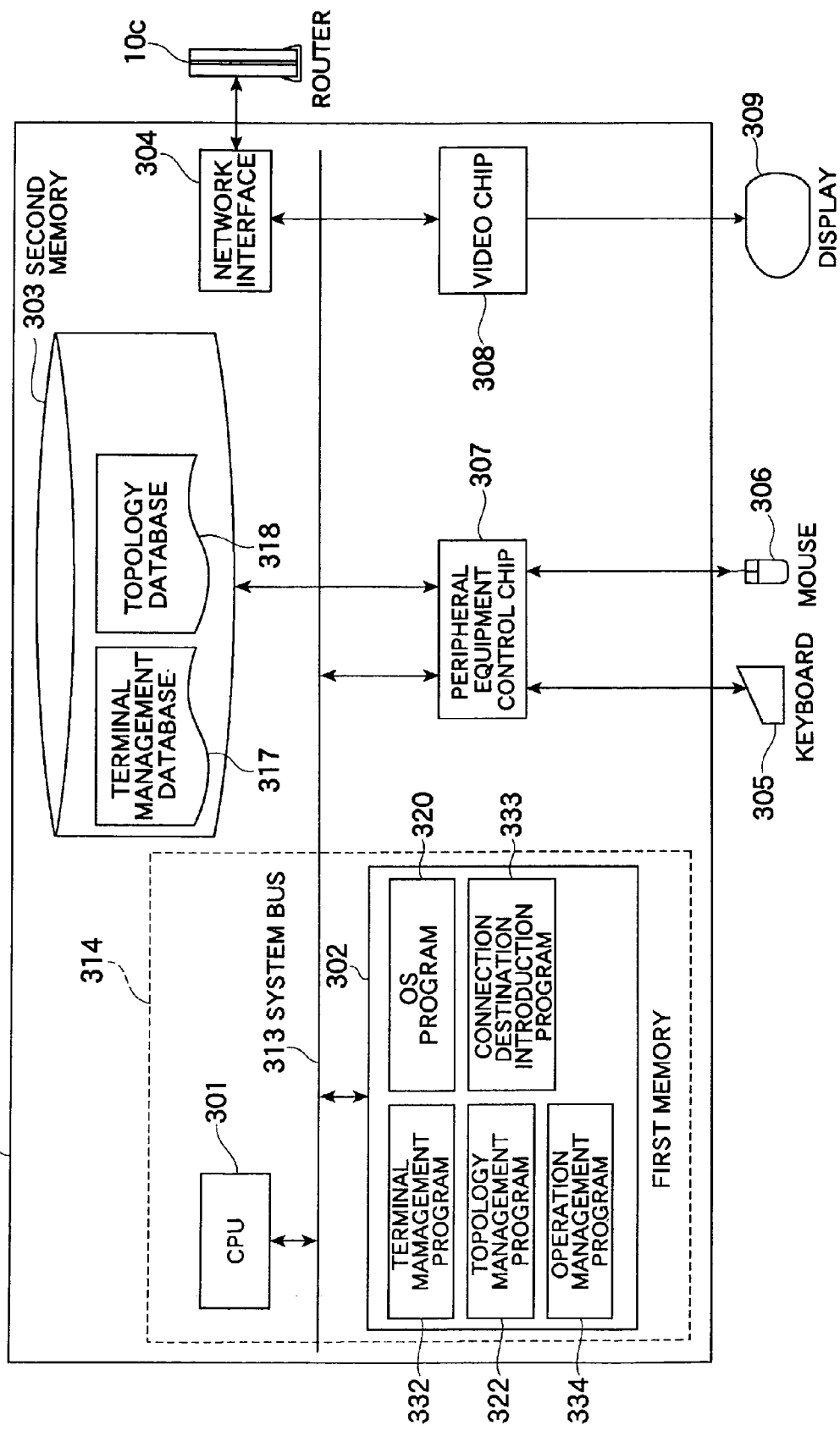
FIG. 12 is a diagram showing an example of an outline configuration of a management server in the embodiment.

The management server 3, a general personal computer being applicable as well as a dedicated server computer, being configured, as shown in FIG. 12, including a CPU 301, a first memory 302, as a rewritable main storage section which stores various kinds of program and the like, a second memory 303, configured of an HDD or the like, which stores various kinds of data and the like, a network interface 304, which carries out communication with the broadcasting station terminal 1 and the terminal apparatus 2 via the internet, a peripheral equipment control chip 307, which controls an input section such as a keyboard 305, a mouse 306 or the like, capable of inputting predetermined information, and a video chip 308, which receives image data from the CPU 301 and, as well as writing them into an internal video memory (not shown), displays the data written into the video memory on a display 309, to be described hereafter, these various kinds of component are mutually connected via a system bus 313. In the embodiment, a controller 314 is configured of the CPU 301 and the first memory 302. The network interface 304 is connected to the internet via a router 10c.

The second memory 303 has a terminal management database 317, functioning as a connection condition information storage section which stores location information such as IP addresses or domain names, which are location positions of the broadcasting station terminal 1 and terminal apparatus 2 configuring the hierarchical structure, and a topology database 318, functioning as a connection condition information storage section which stores a broadcasting channel topology condition, that is, a connection condition of the broadcasting station terminal 1 and terminal apparatus 2.

First Memory 302

An OS program 320 for providing basic functions of the management server 3 as a computer, a terminal management program 332 for managing location information of a plurality of terminal apparatus 2 to be connected to a distribution channel, location information of the broadcasting station terminal 1, and the like, a topology management program 322 for carrying out a construction, and a management and the like, of a broadcasting channel tree-shaped hierarchical structure, a connection destination introduction program 333 for determining a connection destination candidate of a distribution channel corresponding to a connection destination introduction request transmitted from a terminal apparatus 2, and carrying out a transmission of information on the connection destination candidate to the terminal apparatus 2, and the like, an operation management program 334 for carrying out an operation management and the like of the contents distribution system S, and the like being stored in the first memory 302, they are retrieved by the CPU 301, and functions according to the programs are executed by the CPU 301.

Herein, the OS program 320, by being retrieved and executed by the CPU 301, renders executable functions relating to an input and output of the keyboard 305 and mouse 306, and basic functions of the computer, such as a memory management of the first memory 302, the second memory 303, and the like. Then, in a condition in which the OS program is executed by the CPU 301, the heretofore described terminal management program 332, topology management program 322, connection destination introduction program 333, operation management program 334, and the like, are executed.

It is acceptable to arrange in such a way that that the OS program 320, terminal management program 332, topology management program 322, connection destination introduction program 333, operation management program 334, and the like are, for example, downloaded into the first memory 302 from a server, or the like, connected to the internet, or that programs recorded on a recording medium such as a CD-ROM are loaded into the first memory 302 via a drive of the recording medium.

Controller 314

The controller 314, being configured, as heretofore described, of the CPU 301 and first memory 302, centrally controls a whole of the management server 3 by the CPU 301 retrieving and executing the various kinds of program stored in the first memory 302, as well as functioning as a connection destination candidate selection section, a notification section, a reception section, a transmission section, an authentication section, a topology management section, a terminal management section, and the like, to be described hereafter.

The controller 314 functions as the terminal management section and the like by the CPU 301 executing the terminal management program 332, also, as the topology management section and the like by the CPU 301 executing the topology management program 322, and furthermore, as the connection destination candidate selection section, the notification section, the reception section, the transmission section, and the like, by the CPU 301 executing the connection destination introduction program 333.

Connection Destination Candidate Selection Section

The connection destination candidate selection section, when receiving a connection destination introduction request from a new participation terminal apparatus 2X, selects a suitable connection destination candidate based on connection condition information, such as a structural condition of the hierarchical structure of the contents distribution system S stored in the connection condition information storage section.

Topology Management Program 322

By executing the topology management program 322, the CPU 301, in the event that there is a connection destination introduction request from a new participation terminal apparatus 2X, searches the topology database 318 for a terminal apparatus 2, to which it is possible to connect, to become a parent and, as a search result, returns location information of the terminal apparatus 2 to the new participation terminal apparatus 2X.

Also, the CPU 301, by executing the topology management program 322, having a function of adding information on the terminal apparatus 2 to, or deleting it from, a topology table stored in the topology database 318, has a function of carrying out an addition or change of information in the topology database 318, based on a connection destination introduction request, a connection severance request, or the like, from the terminal apparatus 2.

Notification Section

The notification section has a function of notifying the terminal apparatus 2 which has transmitted the connection destination introduction request of the connection destination candidate selected by the connection destination candidate selection section. The notification of the connection destination candidate includes information on the connection destination candidate, that is, information on the IP address, port number, and the like, of the terminal apparatus which is the connection destination candidate.

Reception Section

The reception section receives a connection destination introduction request from an apparatus such as a new participation terminal apparatus 2X. Also, the reception section has a function of receiving license information transmitted by a new participation terminal apparatus 2X which is to view or listen to a specific channel.

Transmission Section

The transmission section transmits the connection destination candidate selected by the connection destination candidate selection section to the new participation terminal apparatus 2X which has transmitted the connection destination introduction request.

Authentication Section

The authentication section carries out a process determining whether or not license information transmitted by a new participation terminal apparatus 2X is legitimate license information. It is acceptable that the authentication process involves transmitting the license information to the license issuing server 6 and requesting an authentication, and it is also acceptable to arrange in such a way that the license authentication program 227 of the authentication section carries out the authentication process independently.

In the event that the authentication section recognizes that the license information received is legitimate license information, it instructs the transmission section to transmit a connection destination candidate.

The terminal management section, on receiving a user terminal registration request from a terminal apparatus 2, registers the IP address and the like, which is location information of the terminal apparatus 2, in the terminal management database 317. Also, in the event too of receiving a broadcasting station terminal registration request from the broadcasting station terminal 1, the terminal management section registers the IP address and the like, which is location information of the broadcasting station terminal 1, in the terminal management database 317. The location information such as the IP addresses being included in the user terminal registration request and broadcasting station terminal registration request, the location information is acquired from these registration requests.

Terminal Management Program 332

The CPU 301, by executing the terminal management program 332, in the event that there is a request from the broadcasting station terminal 1 to be registered as a broadcasting station, carries out a process registering a channel number given to the broadcasting station terminal 1, and the location information of the broadcasting station terminal 1, in the terminal management database 317.

Next, a description will be given, using FIG. 13, of an overall process executed by the controller 314 of the management server 3.

Figure 13:
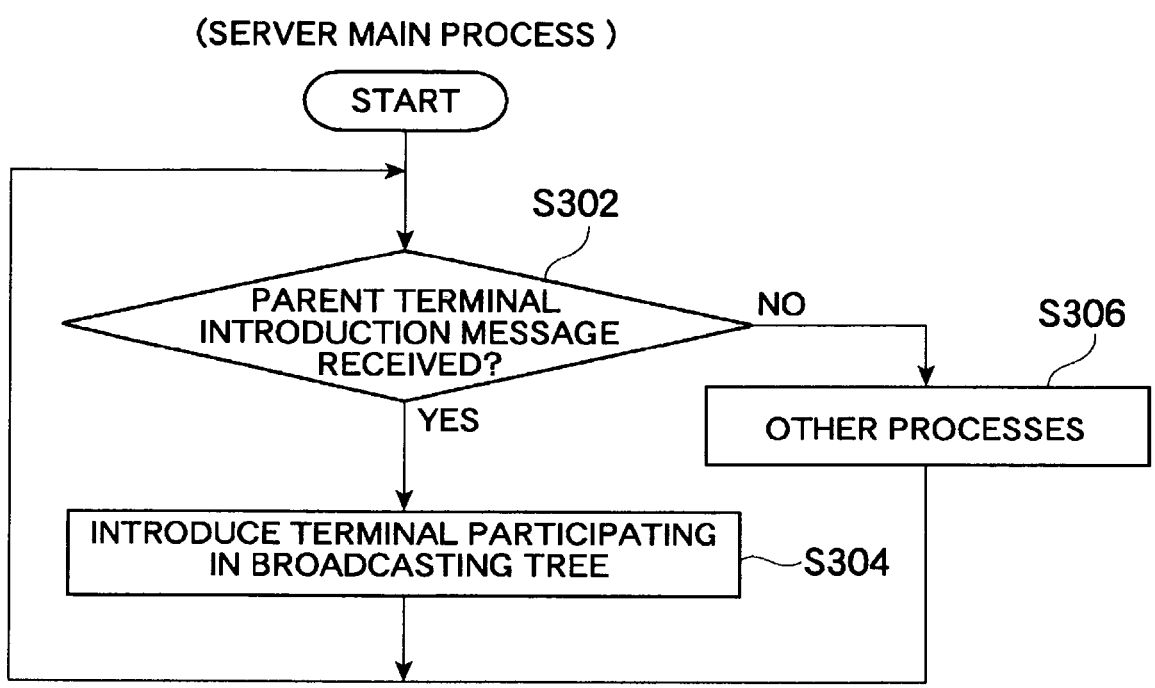
FIG. 13 is a flowchart of an overall process executed by a controller of the management server.

FIG. 13 is a flowchart of the overall process executed by the controller 314 of the management server 3.

On power of the management server 3 being turned on, and initialization of the programs finishing, the process executed by the controller 314 proceeds to S302, and the controller 314 carries out a determination of whether or not it has received a parent terminal introduction message from a new participation terminal apparatus 2X. If it has not received a connection destination introduction request from a new participation terminal apparatus 2X, the controller 314 branches off to S306 and, after executing other processes in the management server 3 in S306, returns to S302. Also, if it has received a connection destination introduction request from a new participation terminal apparatus 2X, the controller 314 proceeds to S304.

In S304, having received a connection destination introduction request from a new participation terminal apparatus 2X, the controller 314 selects a terminal apparatus 2, which can be relayed, to become a parent from the topology database 318, and acquires its location information. Connection condition information of a plurality of terminal apparatus 2 configuring the hierarchical structure is stored in a connection condition information storage section of the topology database 318. On receiving the connection destination introduction request from the new participation terminal apparatus 2X which is not yet configuring the hierarchical structure, the connection destination candidate selection section selects a terminal apparatus 2 to become a connection destination candidate from the connection condition information stored in the connection condition information storage section.

Next, the notification section carries out a process notifying the new participation terminal apparatus 2X which has transmitted the connection destination introduction request of the connection destination candidate selected by the connection destination candidate selection section. On transmitting the location information of the connection destination candidate to the new participation terminal apparatus 2X, the process executed by the controller 314 returns to S302.

In this way, the management server 3 can select a terminal apparatus 2 corresponding to a connection destination introduction request received from a new participation terminal apparatus 2X, and notify the new participation terminal apparatus 2X.

Figure 14:
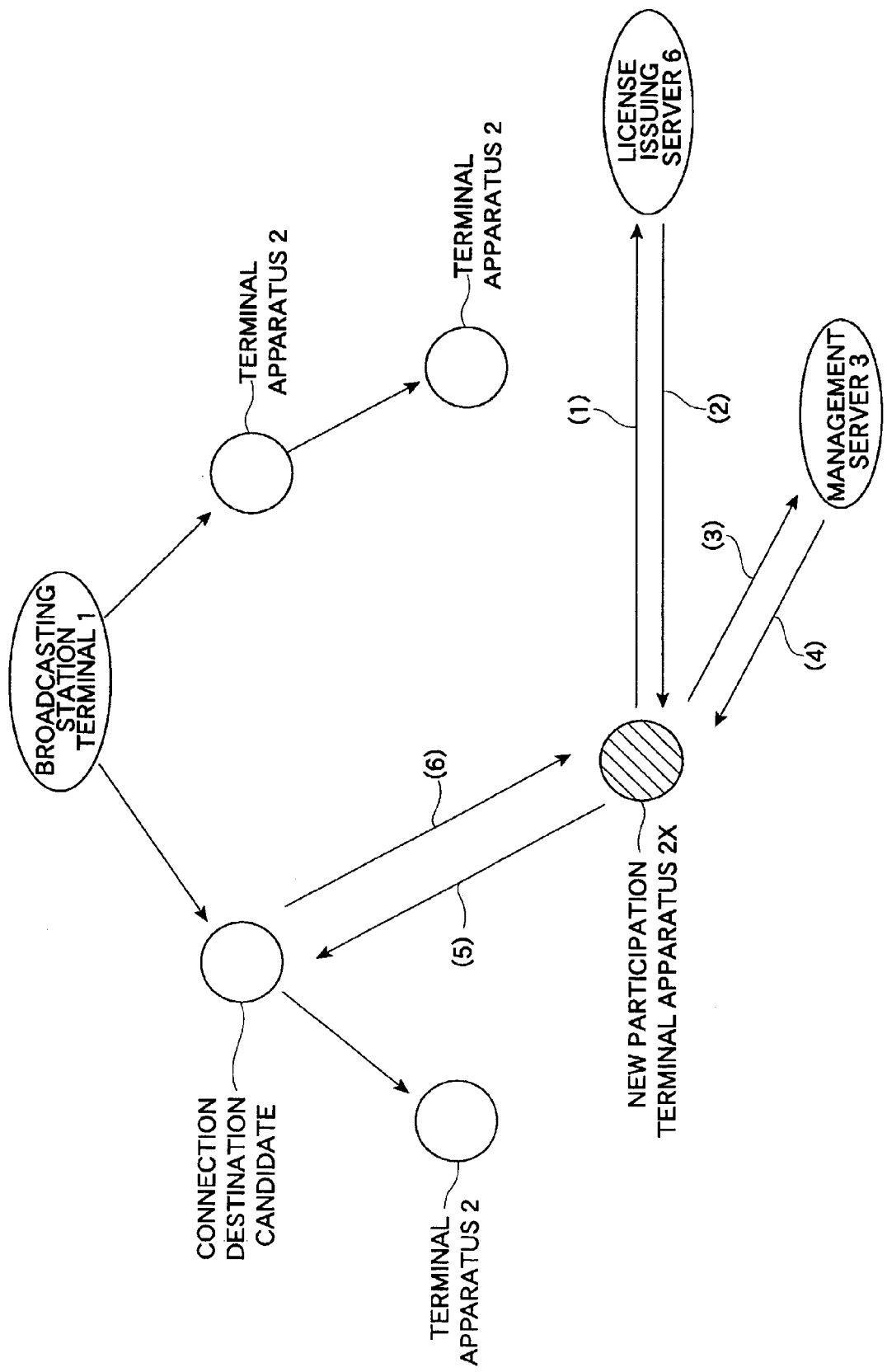
FIG. 14 is a diagram showing processes until the new participation terminal apparatus participates in the contents distribution system, and acquires a contents decoding key.

Next, a description will be given, using FIG. 14, of an order of processes until a new participation terminal apparatus 2X participates in the contents distribution system S, and acquires a contents decoding key.

In the event that the user is to view or listen to charged contents, the controller 314, executing processes 1 and 2 described hereafter, acquires a license before transmitting a connection destination introduction request to the management server 3. In the event that the user is to view or listen to free contents, or in the event that the user is to view or listen to contents for a fixed fee, the controller 314 executes process 3, transmitting a connection destination introduction request to the management server 3, without acquiring a license.

1. Firstly, on a new participation terminal apparatus 2X being instructed by the user to make a request to purchase a license, the new participation terminal apparatus 2X connects to the license issuing server 6, downloads a license purchasing form, and displays it on the built-in display 209. On a completion of necessary items by the user finishing, the new participation terminal apparatus 2X uploads the purchasing form to the license issuing server 6.

2. Next, the license issuing server 6 carries out a purchase settlement based on details of the purchasing form, issues a license, and transmits license information to the new participation terminal apparatus 2X which is the source of the request.

3. On a request arising in a new participation terminal apparatus 2X for viewing or listening to a predetermined channel, the new participation terminal apparatus 2X transmits a connection destination introduction request, including information requesting the viewing or listening to the specified channel and request source location information representing a location of the source of the request, to the management server 3.

4. The management server 3, on receiving the connection destination introduction request from the new participation terminal apparatus 2X, selects a connection destination candidate, which can be relayed, from the topology database 318, and transmits it to the new participation terminal apparatus 2X which has transmitted the connection destination introduction request.

5. The new participation terminal apparatus 2X, on receiving the connection destination candidate from the management server 3, as well as transmitting a participation request for participating in the contents distribution system S to the connection destination candidate, transmits a participation disclosure key for encoding a contents decoding key.

At this time, simply transmitting the disclosure key to the connection destination candidate creates a possibility of another terminal apparatus of a third person "impersonating", and transmitting a disclosure key. In order to prevent this problem, there is a method asking the new participation terminal apparatus 2X to present license information for a contents preview, or a method inscribing the disclosure key in an electronic certificate, and transmitting it to the terminal apparatus 2 which is the connection destination candidate.

In the case of inscribing the disclosure key in an electronic certificate, and transmitting it to the terminal apparatus 2 which is the connection destination candidate, information on the participation disclosure key, information on an a holder, information on an issue certification authority, and a signature of the certification authority are included in the electronic certificate, and transmitted.

6. The terminal apparatus 2 which is the connection destination candidate, on receiving the participation request and participation disclosure key from the terminal apparatus which does not configure the hierarchical structure, generates an encoded decoding key, which is a contents decoding key encoded using the received participation disclosure key, and transmits it to the new participation terminal apparatus 2X.

Also, in the event that the terminal apparatus 2 which is the connection destination candidate receives the electronic certificate from the new participation terminal apparatus 2X, it carries out a communication with the certification authority verifying the signature on the electronic certificate and, in the event of verifying that the information on the participation disclosure key is identical to that registered with the certification authority, encodes a contents decoding key using the received participation disclosure key, and transmits it to the new participation terminal apparatus 2X.

The new participation terminal apparatus 2X, using a participation secret key stored in the participation key storage section, decodes the encoded decoding key received, acquiring the contents decoding key.

Subsequently, the terminal apparatus 2 which is the connection destination candidate carries out a streaming distribution of encoded contents data to the new participation terminal apparatus 2X. The new participation terminal apparatus 2X which receives the encoded contents data decodes the encoded contents data received, using the contents decoding key, acquiring the contents data. By the contents data reproduction section of the new participation terminal apparatus 2X carrying out a reproduction of the decoded contents data, the user can preview the contents.

In this way, by a new participation terminal apparatus 2X transmitting a participation disclosure key to a connection destination candidate, and acquiring an encoded contents decoding key, there is no need for a key server for transmitting a decoding key to the new participation terminal apparatus 2X.

Also, with a heretofore known contents distribution system which distributes a decoding key to each terminal apparatus 2 along with encoded contents data, as it is easily possible for a third person to steal the decoding key, a problem has occurred in that it is easy for a third person with no right to preview the contents, but by transmitting an encoded decoding key, which is difficult for a third person to decode, to the new participation terminal apparatus 2X, it is possible to prevent a preview of contents by a person who does not have a right to view or listen.

Next, a description will be given, using FIG. 15, of processes when a terminal apparatus 2 withdraws from the contents distribution system S.

Figure 15:
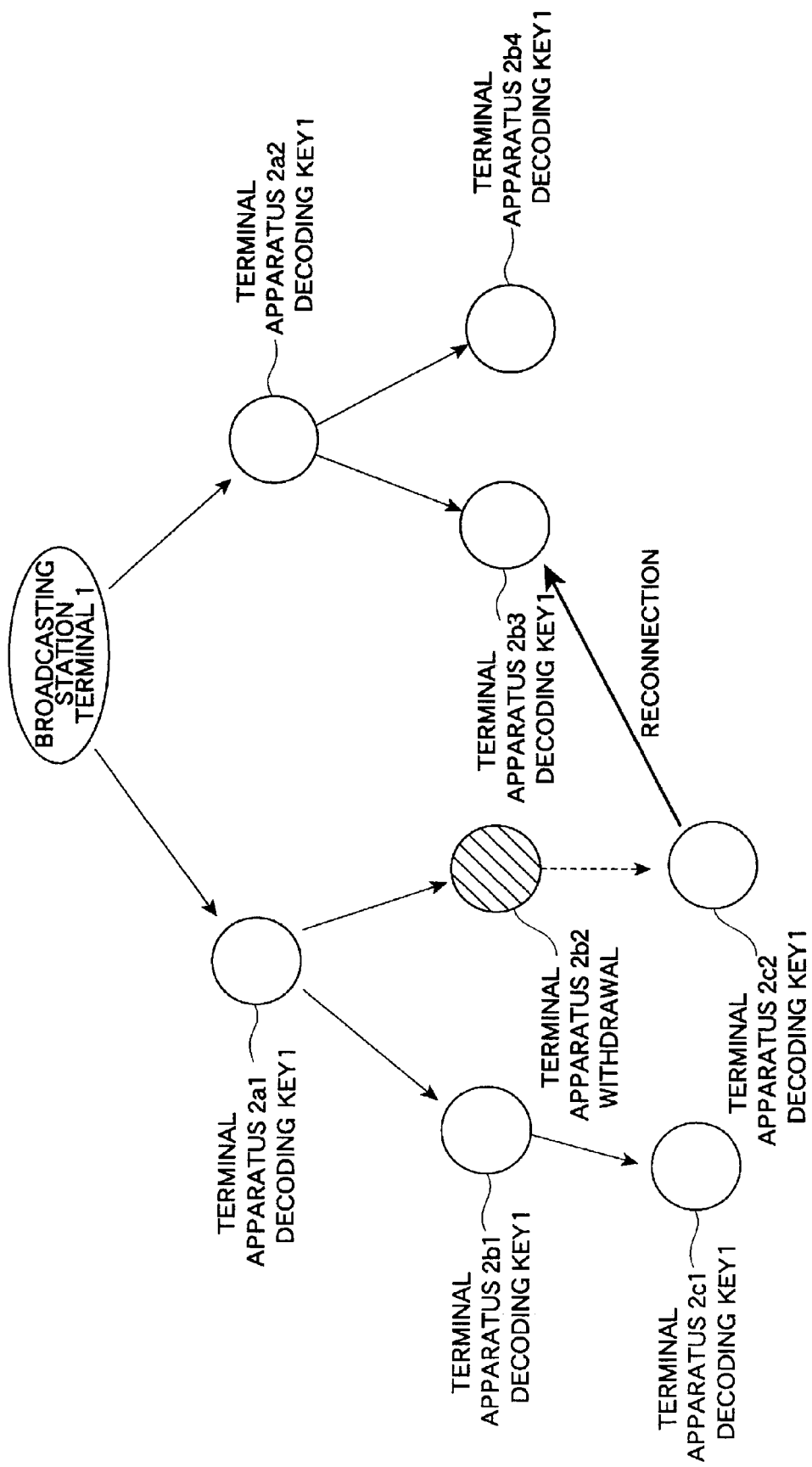
FIG. 15 is a diagram showing processes when the terminal apparatus which is functioning as the parent terminal apparatus withdraws from the contents distribution system S.

FIG. 15 is a diagram showing an order of processes when a terminal apparatus 2 which is functioning as a parent terminal in the contents distribution system S withdraws from the contents distribution system S.

As has been described in FIG. 9, in the case in which all the terminal apparatus 2 in the contents distribution system S are relaying identical encoded contents data, a decoding key for decoding the encoded contents data is common to all the terminal apparatus 2. Consequently, even at a time when a parent terminal apparatus 2 which is functioning as a parent terminal in the contents distribution system S withdraws from the contents distribution system S, there is no need for a lower level terminal apparatus 2 to reacquire the decoding key from a newly introduced connection destination candidate.

Next, a description will be given, using FIG. 16, of an embodiment of carrying out a distribution of encoded contents data using a differing encoding key between each pair of terminal apparatus.

Figure 16:
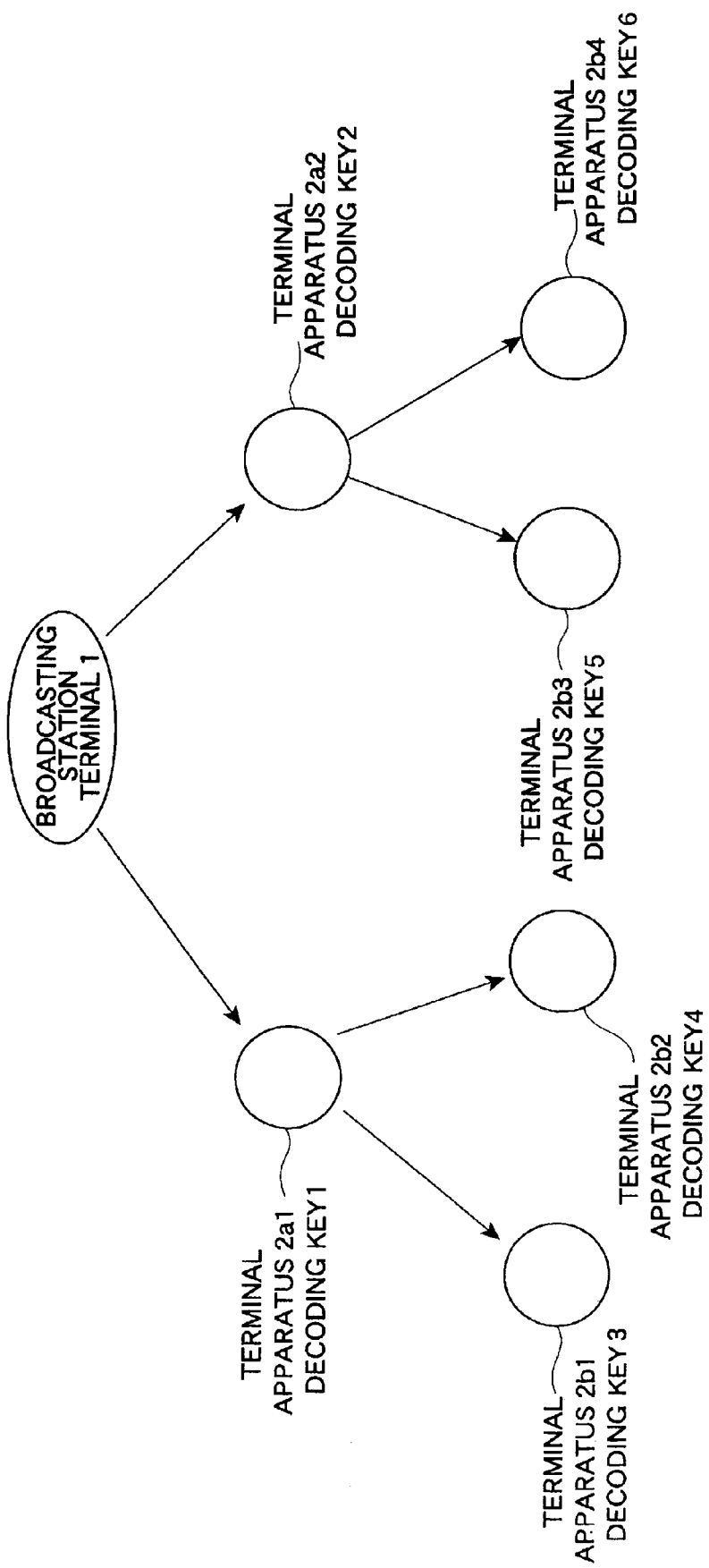
FIG. 16 is a diagram showing an embodiment which distributes encoded contents data encoded using a differing encoding key between each pair of terminal apparatus.

FIG. 16 shows a contents distribution system S which carries out the distribution of the encoded contents data using a differing encoding key between each pair of terminal apparatus.

As has been described in FIG. 10, by providing each terminal apparatus 2 with a function which encodes contents data, it is possible to re-encode distributed encoded contents data. By generating encoded contents data using a unique encoding key between each pair of terminal apparatus 2, and decoding the encoded contents data using the unique decoding key, it is possible to maintain higher security.

Figure 17:
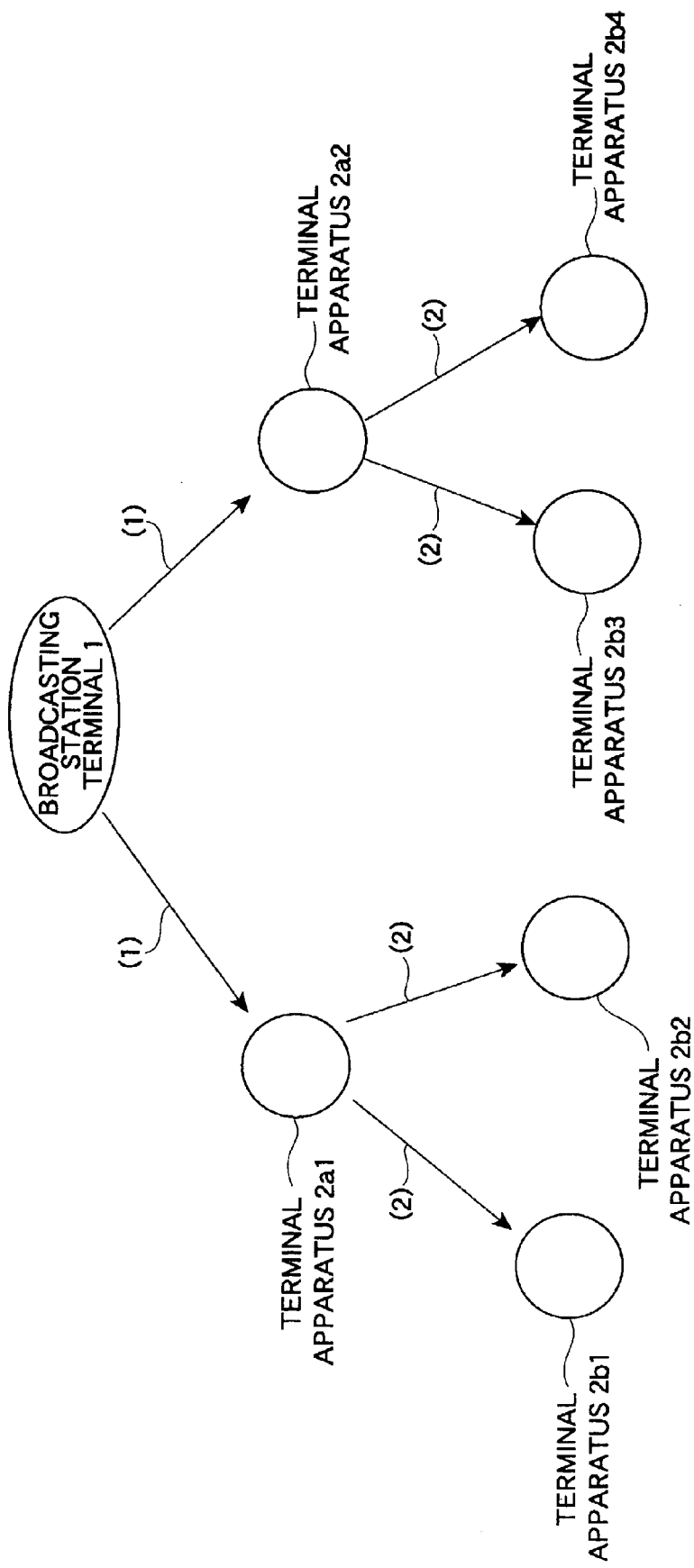
FIG. 17 is a diagram illustrating an embodiment of changing the contents encoding key during the contents distribution.
Figure 18:
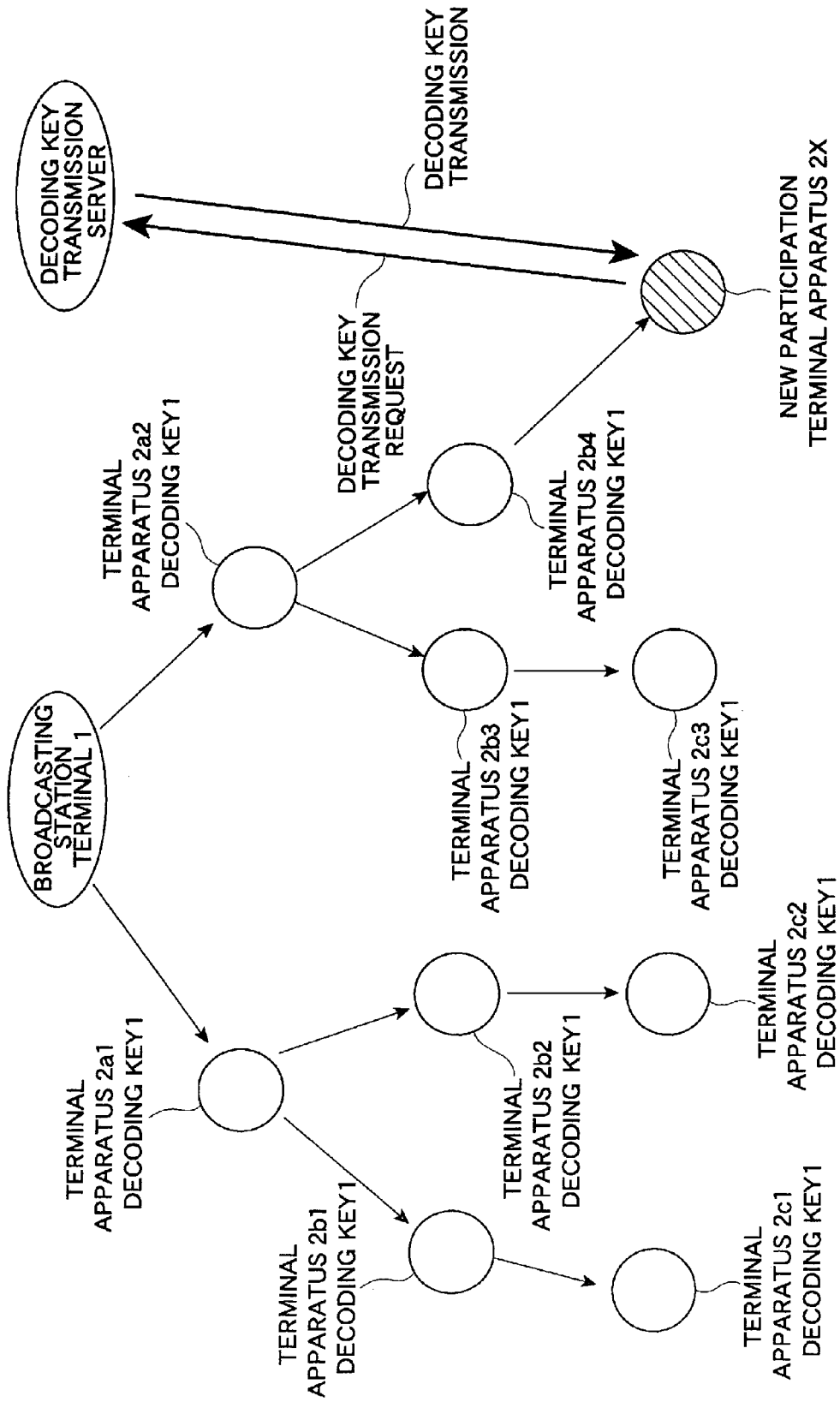
FIG. 18 is a diagram showing a heretofore known method acquiring a decoding key for decoding encoded contents from a key server.

Next, a description will be given, using FIG. 17, of an embodiment of changing a contents encoding key during a contents distribution. FIG. 17 is a diagram illustrating the embodiment of changing the contents encoding key during the contents distribution. For example, in a case in which the broadcasting station terminal 1 carries out a distribution of contents using a different contents encoding key from 12 a.m. onward, a new contents decoding key is transmitted to each terminal apparatus 2 at around 11 p.m., before the change (step 1). The terminal apparatus 2 which receive the new contents decoding key, furthermore, transmit the new contents decoding key to downstream terminal apparatus (step 2). Each terminal apparatus 2, carrying out a decoding of encoded contents data using the new decoding key from 12 a.m. onward, carries out a reproduction of the contents. By this means, it is possible to carry out a distribution of encoded contents data using a differing encoding key at each predetermined time.

Also, the invention is not limited to the heretofore described embodiments. The heretofore described embodiments being illustrations, any embodiment having a configuration essentially identical to a technical idea described in the claims of the invention, and producing the same kind of operational effect, in whatsoever case, is included in the technical scope of the invention.

Also, all disclosures of Japanese Patent Application (No. 2006-054049), including the specification, the claims, the drawings and the abstract, applied for on Feb. 28, 2006, are incorporated herein by reference.

Although the embodiment and modification of the present invention have been described in detail herein, the scope of the invention is not limited thereto. It will be appreciated by those skilled in the art that various modifications may be made without departing from the scope of the invention. Accordingly, the embodiment and modification disclosed herein are only exemplary. It is to be understood that the scope of the invention is not to be limited thereby, but is to be determined by the claims which follow.

What is claimed is:

1. A contents distribution system comprising a connection management apparatus which manages in such a way that a plurality of terminal apparatus are logically connected, multi-layered in a hierarchical structure, with a distribution apparatus which distributes contents data as an apex, wherein the contents data distributed from the distribution apparatus being sequentially relayed to a lower level terminal apparatus by a relaying function of the terminal apparatus, and distributed to the plurality of terminal apparatus, the contents data can be reproduced by the plurality of terminal apparatus, the connection management apparatus including:
a connection condition information storage section which stores connection condition information of the terminal apparatus configuring the hierarchical structure;
a connection destination candidate selection section which, in response to receiving a connection destination introduction request from a terminal apparatus which is not configuring the hierarchical structure, selects a connection destination candidate from the plurality of the terminal apparatus in the hierarchical structure based on the connection condition information stored in the connection condition information storage section; and
a notification section which notifies the terminal apparatus which has transmitted the connection destination introduction request of the connection destination candidate selected by the connection destination candidate selection section, and the terminal apparatus including:
a participation key storage section which stores a participation disclosure key and a participation secret key corresponding to the participation disclosure key for participating in the distribution system where the content data is distributed in the hierarchical structure;
a connection destination introduction request transmission section which transmits the connection destination introduction request to the connection management apparatus;
a connection destination candidate reception section which receives the connection destination candidate from the connection management apparatus;
a new participation request section which, in order to connect to the connection destination candidate received from the connection management apparatus, transmits a participation request and the participation disclosure key to the connection destination candidate for participating in the distribution system where the content data is distributed in the hierarchical structure;
an encoded decoding key reception section which receives an encoded decoding key from the connection destination candidate, the encoded decoding, key being encoded by the participation disclosure key;
a contents decoding key acquisition section which decodes the encoded decoding key received by the encoded decoding key reception section, with the participation secret key;
a contents decoding key storage section which stores the contents decoding key decoded by the contents decoding key acquisition section;
a contents data reception section which receives encoded contents data transmitted from the connection destination candidate;
a contents data decoding section which decodes the encoded contents data with the contents decoding key; and
a contents data reproduction section which reproduces the contents data decoded by the contents data decoding section.

2. The contents distribution system according to claim 1, wherein the distribution apparatus includes:
a contents data storage section which stores the contents data;
a contents encoding key storage section which stores a contents encoding key which encodes the contents data;

a contents data encoding section which encodes contents data stored in the contents data storage section with the contents encoding key, generating encoded contents data;

a contents decoding key storage section which stores a contents decoding key necessary for decoding the encoded contents data; and an encoded contents data transmission section which transmits the encoded contents data, and the terminal apparatus includes:

a new participation request reception section which receives the participation request and participation disclosure key from the terminal apparatus which is not configuring the hierarchical structure;

a decoding key encoding section which encodes the contents decoding key, stored in the contents decoding key storage section, with the participation disclosure key received by the new participation request reception section, generating the encoded decoding key;

an encoded decoding key transmission section which transmits the encoded decoding key to the terminal apparatus which has made the participation request; and an encoded contents data relaying section which relays the encoded contents data to a connected lower level terminal apparatus.

3. The contents distribution system according to claim 1, wherein the terminal apparatus includes:

a re-encoding key storage section which stores a contents re-encoding key which re-encodes the contents data decoded by the contents data decoding section;

a contents data re-encoding section which encodes the decoded contents data with the contents re-encoding key, generating re-encoded contents data;

a re-encoded contents decoding key storage section which stores a contents decoding key necessary to decode the re-encoded contents data;

a new participation request reception section which receives the participation request and participation disclosure key from the terminal apparatus which is not configuring the hierarchical structure;

a decoding key encoding section which encodes the contents decoding key, stored in the re-encoded contents decoding key storage section, with the participation disclosure key received by the new participation request reception section, generating the encoded decoding key;

an encoded decoding key transmission section which transmits the encoded decoding key to the terminal apparatus which has made the participation request; and a re-encoded contents data transmission section which transmits the re-encoded contents data encoded by the contents data re-encoding section to the terminal apparatus which has made the participation request.

4. A contents distribution method using a contents distribution system including a connection management apparatus which manages in such a way that a plurality of terminal apparatus are logically connected, multi-layered in a hierarchical structure, with a distribution apparatus which distributes contents data as an apex, wherein the contents data distributed from the distribution apparatus being sequentially relayed to a lower level terminal apparatus by a relaying function of the terminal apparatus, and distributed to the plurality of terminal apparatus, the contents data can be reproduced by the plurality of terminal apparatus, the method comprising:

a step of the connection management apparatus storing connection condition information of the terminal apparatus configuring the hierarchical structure;

a step of the terminal apparatus transmitting a connection destination introduction request to the connection management apparatus;

a step of the connection management apparatus, in response to receiving the connection destination introduction request from a terminal apparatus which is not configuring the hierarchical structure, selecting a connection destination candidate from the plurality of the terminal apparatus in the hierarchical structure based on the connection condition information stored in a connection condition information storage section;

a step of the connection management apparatus notifying the terminal apparatus which has transmitted the connection destination introduction request of the selected connection destination candidate;

a step of the terminal apparatus receiving the connection destination candidate from the connection management apparatus;

a step of the terminal apparatus, in order to connect to the connection destination candidate received from the connection management apparatus, transmitting a participation request, and a participation disclosure key stored in a participation key storage section, to the connection destination candidate for participating in the distribution system where the content data is distributed in the hierarchical structure;

a step of the terminal apparatus receiving an encoded decoding key from the connection destination candidate, the encoded decoding key being encoded by the participation disclosure key;

a step of the terminal apparatus decoding the received encoded decoding key with a participation secret key corresponding to the participation disclosure key, generating a contents decoding key;

a step of the terminal apparatus receiving encoded contents data transmitted from the connection destination candidate;

a step of the terminal apparatus decoding the encoded contents data with the contents decoding key; and a step of the terminal apparatus reproducing the decoded contents data.

5. A terminal apparatus in a contents distribution system including a plurality of terminal apparatus logically connected, multi-layered in a hierarchical structure, with a distribution apparatus which distributes contents data as an apex, wherein the contents data distributed from the distribution apparatus are sequentially relayed to a lower level by a relaying function of the terminal apparatus, and distributed to the plurality of terminal apparatus, the terminal apparatus comprising:

a participation key storage section which stores a participation disclosure key and a participation secret key corresponding to the participation disclosure key for participating in the distribution system where the content data is distributed in the hierarchical structure;

a new participation request section which, in order to connect to an existing connection destination candidate already participating in the contents distribution system, transmits a participation request and the participation disclosure key to the connection destination candidate for participating in the distribution system where the content data is distributed in the hierarchical structure;

an encoded decoding key reception section which receives an encoded decoding key from the connection destination candidate, the encoded decoding key being encoded by the participation disclosure key;

a contents decoding key acquisition section which decodes the encoded decoding key received by the encoded decoding key reception section, with the participation secret key;

a contents decoding key storage section which stores the contents decoding key decoded by the contents decoding key acquisition section;

a contents data reception section which receives encoded contents data transmitted from the connection destination candidate;

a contents data decoding section which decodes the encoded contents data with the contents decoding key; and a contents data reproduction section which reproduces the contents data decoded by the contents data decoding section.

6. The terminal apparatus according to claim 5, comprising:

a new participation request reception section which receives the participation request and participation disclosure key from a new participation terminal apparatus which is not configuring the hierarchical structure;

a decoding key encoding section which encodes the contents decoding key, stored in the contents decoding key storage section, with the participation disclosure key received by the new participation request reception section, generating the encoded decoding key;

an encoded decoding key transmission section which transmits the encoded decoding key to the new participation terminal apparatus which has made the participation request; and an encoded contents data relaying section which relays the encoded contents data to a connected lower level terminal apparatus.

7. The terminal apparatus according to claim 5, comprising:

a re-encoding key storage section which stores a contents re-encoding key which re-encodes the contents data decoded by the contents data decoding section;

a contents data re-encoding section which encodes the decoded contents data with the contents re-encoding key, generating re-encoded contents data;

a re-encoded contents decoding key storage section which stores a contents decoding key necessary to decode the re-encoded contents data;

a new participation request reception section which receives the participation request and participation disclosure key from the terminal apparatus which is not configuring the hierarchical structure;

a decoding key encoding section which encodes the contents decoding key, stored in the re-encoded contents decoding key storage section, with the participation disclosure key received by the new participation request reception section, generating the encoded decoding key;

an encoded decoding key transmission section which transmits the encoded decoding key to the terminal apparatus which has made the participation request; and a re-encoded contents data transmission section which transmits the re-encoded contents data encoded by the contents data re-encoding section to the terminal apparatus which has made the participation request.

8. The terminal apparatus according to claim 7, comprising:

a contents re-encoding key setting section which sets the contents re-encoding key, and stores it in the re-encoding key storage section; and a contents decoding key setting section which sets the contents decoding key for decoding re-encoded contents data encoded by the contents re-encoding key stored in the re-encoding key storage section, and stores it in the re-encoded contents decoding key storage section.

9. The terminal apparatus according to claim 8, wherein the contents re-encoding key setting section sets the contents re-encoding key for each item of encoded contents data received by the contents data reception section.

10. The terminal apparatus according to claim 8, wherein the contents re-encoding key setting section sets the contents re-encoding key at each predetermined time.

11. The terminal apparatus according to claim 8, wherein the contents re-encoding key setting section sets the contents re-encoding key for each new participation terminal apparatus which has made the participation request.

12. The terminal apparatus according to claim 9, comprising:

a contents re-encoding key generation section which newly generates the contents re-encoding key for each item of encoded contents data received by the contents data reception section, at each predetermined time, or for each new participation terminal apparatus which has made the participation request; and a contents decoding key generation section which generates the contents decoding key for decoding re-encoded contents data, encoded with the contents re-encoding key, by the contents re-encoding key generation section, wherein the contents re-encoding key setting section sets the generated contents re-encoding key, and stores it in the re-encoding key storage section, and the contents decoding key setting section sets the generated contents decoding key, and stores it in the re-encoded contents decoding key storage section.

13. The terminal apparatus according to claim 8, wherein the contents re-encoding key setting section sets one contents re-encoding key from among a plurality of settable contents re-encoding keys, and stores it in the re-encoding key storage section, and the contents decoding key setting section sets one contents decoding key from among a plurality of contents decoding keys which are settable, and which correspond to the plurality of contents encoding keys, and stores it in the re-encoding key storage section.

14. The terminal apparatus according to claim 6, wherein the new participation request reception section has an authentication section which receives license information, proving an existence of a right to reproduce contents data, from the new participation terminal apparatus which has made the participation request, and determines whether or not the license information received is legitimate license information, and the encoded decoding key transmission section, in the event that it is verified that the license information is legitimate license information, transmits the encoded decoding key to the new participation terminal apparatus which has made the participation request.

15. The terminal apparatus according to claim 5, comprising:

an input section with which a user inputs a contents viewing or listening finishing instruction, and a contents decoding key destruction section which, on the viewing or listening finishing instruction being input, destroys the contents decoding key stored in the contents decoding key storage section.

16. A non-transitory recording medium on which is recorded a program for causing a computer to function as each section of the terminal apparatus according to claim 5.

17. The contents distribution system according to claim 1, wherein
the distribution apparatus includes:
a contents data storage section which stores the contents data;
a contents encoding key storage section which stores a contents encoding key which encodes the contents data;
a contents data encoding section which encodes contents data stored in the contents data storage section with the contents encoding key, generating encoded contents data; and
an encoded contents data transmission section which transmits the encoded contents data; and
the terminal apparatus further includes:
a decoding key encoding section which encodes the contents decoding key stored in the contents decoding key storage section, with a disclosure key acquired from the terminal apparatus connected to a lower level terminal apparatus thus generating the encoded decoding key; and
an encoded decoding key transmission section which transmits the encoded decoding key to the lower level terminal apparatus connected to the terminal apparatus.

18. The contents distribution method according to claim 4, further comprising:
a step of the distribution apparatus storing the contents data;
a step of the distribution apparatus storing a contents encoding key which encodes the contents data;
a step of the distribution apparatus encoding contents data stored in the contents data storage section with the contents encoding key, generating encoded contents data;
a step of the distribution apparatus transmitting the encoded contents data,
a step of the terminal apparatus encoding the contents decoding key stored in the contents decoding key storage section, with a disclosure key acquired from the terminal apparatus connected to a lower level terminal apparatus thus generating the encoded decoding key; and
a step of the terminal apparatus transmitting the encoded decoding key to the lower level terminal apparatus connected to the terminal apparatus.

19. The terminal apparatus according to claim 5, wherein
the distribution apparatus includes:
a contents data storage section which stores the contents data;
a contents encoding key storage section which stores a contents encoding key which encodes the contents data;
a contents data encoding section which encodes contents data stored in the contents data storage section with the contents encoding key, generating encoded contents data; and
an encoded contents data transmission section which transmits the encoded contents data, and the terminal apparatus further includes:
a decoding key encoding section which encodes the contents decoding key stored in the contents decoding key storage section, with a disclosure key acquired from the terminal apparatus connected to a lower level terminal apparatus thus generating the encoded decoding key; and an encoded decoding key transmission section which transmits the encoded decoding key to the lower level terminal apparatus connected to the terminal apparatus.

\* \* \* \* \*